US007003635B2

(12) United States Patent
Van Doren

(10) Patent No.: US 7,003,635 B2
(45) Date of Patent: Feb. 21, 2006

(54) GENERALIZED ACTIVE INHERITANCE CONSISTENCY MECHANISM HAVING LINKED WRITES

(75) Inventor: Stephen R. Van Doren, Northborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

(21) Appl. No.: 10/263,742

(22) Filed: Oct. 3, 2002

(65) Prior Publication Data

US 2004/0068621 A1     Apr. 8, 2004

(51) Int. Cl.
G06F 12/00      (2006.01)
G06F 13/28      (2006.01)

(52) U.S. Cl. ......................... 711/150; 711/168; 710/24

(58) Field of Classification Search ........ 711/141–148, 711/150, 130, 153, 154; 709/213, 214, 215; 710/39, 57, 24; 707/8, 201
See application file for complete search history.

(56) References Cited

U.S. PATENT DOCUMENTS

| | | | |
|---|---|---|---|
| 4,847,804 A | 7/1989 | Shaffer et al. | |
| 5,222,224 A | 6/1993 | Flynn et al. | |
| 5,233,616 A | 8/1993 | Callander | |
| 5,297,269 A | 3/1994 | Donaldson et al. | |
| 5,303,362 A | 4/1994 | Butts, Jr. et al. | |
| 5,313,609 A | 5/1994 | Baylor et al. | |
| 5,490,261 A | 2/1996 | Bean et al. | |
| 5,530,933 A | 6/1996 | Frink et al. | |
| 5,537,575 A | 7/1996 | Foley et al. | |
| 5,551,005 A | 8/1996 | Sarangdhar et al. | |
| 5,579,504 A | 11/1996 | Callander et al. | |
| 5,608,893 A | 3/1997 | Slingwine et al. | |
| 5,737,757 A | 4/1998 | Hassoun et al. | |
| 5,761,731 A | 6/1998 | Van Doren et al. | |
| 5,768,621 A * | 6/1998 | Young ......................... 710/24 |
| 5,778,437 A * | 7/1998 | Baylor et al. ................ 711/141 |
| 5,905,998 A | 5/1999 | Ebrahim et al. | |
| 6,014,690 A | 1/2000 | VanDoren et al. | |
| 6,055,605 A | 4/2000 | Sharma et al. | |
| 6,061,765 A | 5/2000 | Van Doren et al. | |
| 6,088,771 A | 7/2000 | Steely, Jr. et al. | |
| 6,094,686 A | 7/2000 | Sharma | |
| 6,101,420 A | 8/2000 | VanDoren et al. | |
| 6,105,108 A | 8/2000 | Steely, Jr. et al. | |
| 6,108,737 A | 8/2000 | Sharma et al. | |
| 6,108,752 A | 8/2000 | VanDoren et al. | |

(Continued)

FOREIGN PATENT DOCUMENTS

EP        0 817 074 A1      7/1998

OTHER PUBLICATIONS

Gharachorloo, K., Lenoski, D., Laudon, J., Gibbons, P., Gupta, A. and Hennessey, J., Memory Consistency and Event Ordering in Scalable Shared-Memory Multiprocessors, (c) 1990 IEEE, pp. 15-26.

(Continued)

*Primary Examiner*—Hong Chong Kim
*Assistant Examiner*—Shane Thomas

(57) ABSTRACT

A system and method provides active inheritance on memory writes such that entities issuing later writes ensure that the effects of earlier writes to the same memory block will be seen. A write chain is preferably formed by storing information and state in miss address file (MAF) entries maintained by the entities. The write chain links the entities requesting write access to the memory block. When the desired memory block becomes available, the information and state stored at the MAF entries is then utilized by each entity in ensuring that all earlier writes are complete before its write is allowed to complete.

18 Claims, 9 Drawing Sheets

U.S. PATENT DOCUMENTS

| | | | |
|---|---|---|---|
| 6,125,429 | A | 9/2000 | Goodwin et al. |
| 6,154,816 | A | 11/2000 | Steely et al. |
| 6,202,126 | B1 | 3/2001 | Van Doren et al. |
| 6,205,494 | B1 * | 3/2001 | Williams ................... 710/5 |
| 6,249,520 | B1 | 6/2001 | Steely, Jr. et al. |
| 6,249,846 | B1 | 6/2001 | Van Doren et al. |
| 6,434,641 | B1 * | 8/2002 | Haupt et al. ................. 710/54 |
| 6,546,465 | B1 * | 4/2003 | Bertone ..................... 711/144 |
| 6,611,906 | B1 * | 8/2003 | McAllister et al. ........ 711/168 |
| 6,718,375 | B1 * | 4/2004 | Hornung et al. ........... 709/223 |
| 6,735,642 | B1 * | 5/2004 | Kagan et al. ................ 710/24 |
| 2004/0068607 | A1 * | 4/2004 | Narad ....................... 711/108 |

OTHER PUBLICATIONS

Jouppi, N., Improving Direct-Mapped Cache Performance by the Addition of a Small Fully-Associative Cache and Prefetch Buffers, (c) 1990 IEEE, pp. 364-373.

Agarwal, A., Simoni, R., Hennesy, J. and Horowitz, M., An Evaluation of Directory Schemes for Cache Coherence, (c)1988 IEEE, pp. 353-362.

Papapanaroos, M. and Patel, J., A Low-Overhead Coherence Solution for Multiprocessors with Private Cache Memories, (c) 1984 IEEE, pp. 284-290.

UltraSPARC Ultra Port Architecture (UPA): The New-Media System Architecture, http://www.sun.com/processors/whitepapers/wp95-023.html, Copyright 1994-2002 Sun Microsystems, pp. 1-4.

Porting OpenVMS Applications to Intel Itanium Architecture, Compaq Conputer Corporation, Apr. 2002, pp. 1-17.

Adve, S., Hill, M., Miller, B. and Nester, R., Detecting Data Races on Weak Memory Systems, (c) 1991 ACM, pp. 234-243.

Gharachorloo, K., Sharma, M., Steely, S. and Van Doren, S., Architecture and Design of AlphaServer GS320, Nov. 2000, pp. 1-12.

IEEE Standard for Scalable Coherent Interface (SCI), (c) 1993 IEEE, pp. Table of Contents, 30-34 and 141-188.

Scales, D. and Gharachorloo, K., Design and Performance of the Shasta Distributed Shared Memory Protocol, XP-000755264, Jul. 7, 1997, pp. 245-252.

Scales, D., Gharachorloo, K. and Thekkath, C., Shasta: A Low Overhead, Software-Only Approach for Supporting Fine-Grain Shared Memory, XP-002173083, Jan. 10, 1996, pp. 174-185.

Scales, D. and Gharachorloo, K., Towards Transparent and Efficient Software Distributed Shared Memory, XP-000771029, Dec. 1997, pp. 157-169.

Scales, D., Gharachorloo, K. and Aggarwal, A., Fine-Grain Software Distributed Shared Memory on SMP Clusters, WRL Research Report 97/3, Feb. 1997, pp. i and 1-28.

* cited by examiner

| DIRECTORY 100 | | | | |
|---|---|---|---|---|
| ADDRESS 103 | OWNER 104 | SHARERS 106 | | |
| | | FIRST SHARER 106a | SECOND SHARER 106b | THIRD SHARER 106c |
| 308 | P3 | - | - | - |
| 157 | MEMORY | P6 | P4 | P3 |
| 221 | MEMORY | P7 | P1 | - |
| 414 | P1 (MEMORY) | P2 | - | - |

FIG. 1
(PRIOR ART)

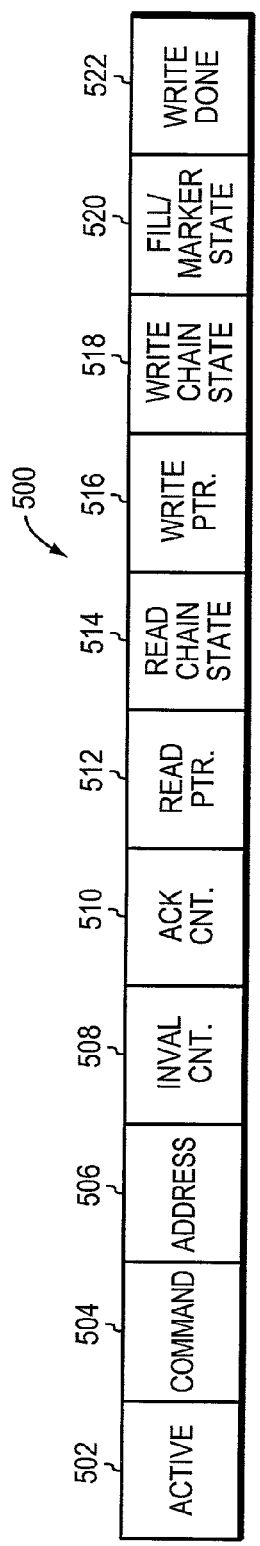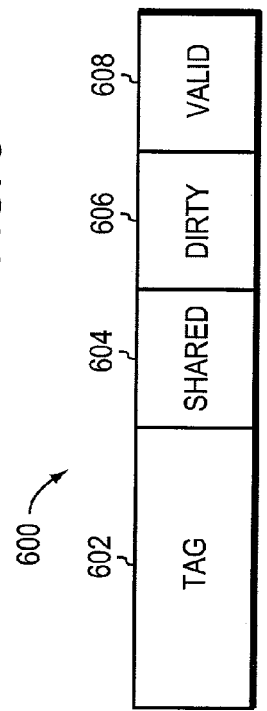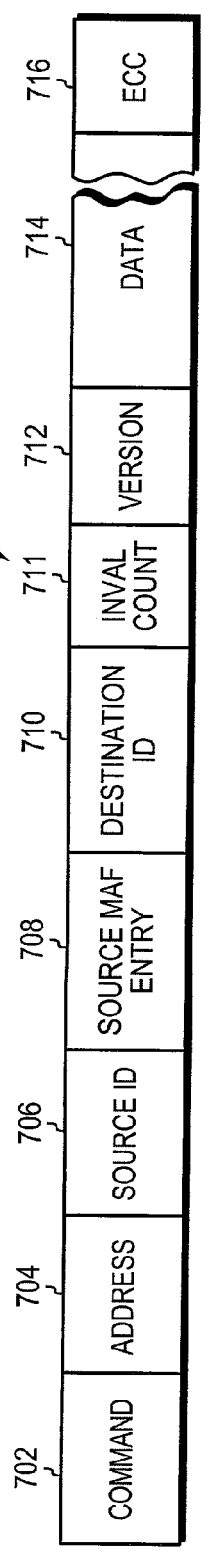

| | DIRECTORY | | | | WRITE-BACK DIRECTORY REGION 804 | |
|---|---|---|---|---|---|---|
| | MAIN DIRECTORY REGION 802 | | | | | |
| | OWNER/ SHARER 814 | SHARER LIST 816 | | UNUSED 818 | ECC 820 | WRITER 822 | UNUSED 824 | ECC 826 |
| | | SHARER 0 816a | SHARER 1 816b (SHARER VECTOR) 816c | | | | | |
| 806a | MEMORY | 0 | 0 | 0 | - | MEMORY | 0 | - |
| 806b | MEMORY | P0 | 0 | 0 | - | MEMORY | 0 | - |
| 806c | P0 | 0 | 0 | 0 | - | MEMORY | 0 | - |
| 806d | P0 | P1 | 0 | 0 | - | MEMORY | 0 | - |
| 806e | P2 | 0 | 0 | 0 | - | P2 | 0 | - |
| 806f | P2 | P3 | 0 | 0 | - | P2 | 0 | - |
| 806g | P2 | 0 | 0 | 0 | - | 0 | 0 | - |
| 807 | P9 | P12 | 0 | 0 | - | MEMORY | 0 | - |
| 808 | P6 | 0 | 01001110000000000 | 0 | - | MEMORY | 0 | - |
| 809 | P10 | 0 | 00001100000000000 | 0 | - | P12 | 0 | - |
| 810 | P8 | 0 | 00000100000000010 | 0 | - | MEMORY | 0 | - |

| | ACTIVE 502 | COMMAND 504 | ADDRESS 506 | INVAL COUNT 508 | ACK COUNT 510 | READ POINTER 512 | READ CHAIN STATE 514 | WRITE POINTER 516 | WRITE CHAIN STATE 518 | FILL STATE 520 | WRITE DONE 522 |
|---|---|---|---|---|---|---|---|---|---|---|---|
| 1202a | YES | READMOD | - | 0 | 0 | 0 | IDLE | 0 | IDLE | ACTIVE | NO |
| 1202b | YES | READMOD | - | 0 | 0 | P1 | ONE | 0 | IDLE | ACTIVE | NO |
| 1202c | YES | READMOD | - | 0 | 0 | P2 | MULTI | 0 | IDLE | ACTIVE | NO |
| 1202d | YES | READMOD | - | 0 | 0 | P3 | MULTI | 0 | IDLE | ACTIVE | NO |
| 1202e | YES | READMOD | - | 1 | 0 | P3 | MULTI | P4 | FREADMOD | ACTIVE | NO |
| 1202f | YES | READMOD | - | 1 | 1 | P3 | IDLE | P4 | FREADMOD | IDLE | YES |
| 1202g | NO | READMOD | - | 1 | 1 | P3 | IDLE | P4 | IDLE | IDLE | YES |

FIG. 12

GENERALIZED ACTIVE INHERITANCE CONSISTENCY MECHANISM HAVING LINKED WRITES

CROSS-REFERENCE TO RELATED APPLICATION

This application is related to the following co-pending, commonly owned U.S. patent Applications:

U.S. patent application Ser. No. 10/263,739 entitled DIRECTORY STRUCTURE PERMITTING EFFICIENT WRITE-BACKS IN A SHARED MEMORY COMPUTER SYSTEM, filed Oct. 3, 2002; and U.S. patent application Ser. No. 10/263,738 entitled LINKED LIST EARLY RACE RESOLUTION MECHANISM, filed Oct. 3, 2002.

BACKGROUND OF THE INVENTION

1. Field of the Invention

This invention relates to computer architectures and, more specifically, to a system and method for ensuring data consistency among a plurality of computer system entities.

2. Background Information

A computer system typically comprises one or more processors linked to a main memory by a bus or other interconnect. In most computer systems, main memory organizes the instructions and data being stored into units typically referred to as "blocks" each of which is separately addressable and may be of a fixed size. Instructions and data are typically moved about the computer system in terms of one or more blocks.

Ordinarily, a processor will retrieve data, e.g., one or more blocks, from main memory, perform some operation on it, and eventually return the results back to main memory. Retrieving data from main memory and providing it to a processor can take significant time especially in terms of the high operating speeds of today's processors. To reduce such latencies as well as to reduce the number of times a processor must access main memory, modern processors and/or processor chipsets include one or more cache memories or caches. A cache is a small, fast memory module that is placed in close proximity to the processor. Many caches are static random access memories (SRAMs), which are faster, but more expensive, than dynamic random access memories (DRAMs), which are often used for main memory. The cache is used to store information, e.g., data or instructions, which the processor is currently using or is likely to use in the near future. There are two basic types of caches: "write-through" caches and "write-back" caches.

With a write-through cache, whenever a processor modifies or updates a piece of data in the processor's cache, main memory's copy of that data is automatically updated. This is accomplished by having the processor write the data back to memory whenever the data is modified or updated. A write-back cache, in contrast, does not automatically send modified or updated data to main memory. Instead, the updated data remains in the cache until some more convenient time, e.g., when the processor is idle, at which point the modified data is written back to memory. The utilization of write-back caches typically improves system performance. In some systems, a write-back or victim buffer is provided in addition to the cache. "Victim data" refers to modified data that is being removed from the processor's cache in order to make room for new data received at the processor. Typically, the data selected for removal from the cache is data the processor is no longer using. The victim buffer stores this modified data which is waiting to be written back to main memory. Modified data in the victim buffer is eventually "victimized", i.e., written back to main memory, at some convenient time.

Symmetrical Multiprocessor (SMP) Systems

Multiprocessor computing systems, such as symmetrical multiprocessor (SMP) systems, provide a computer environment in which software applications may run on a plurality of processors using a single address space or shared memory abstraction. In a shared memory system, each processor can access any data item without a programmer having to worry about where the data is or how to obtain its value. This frees the programmer to focus on program development rather than on managing partitioned data sets and communicating values.

Cache Coherency

Because more than one processor of the SMP system may request a copy of the same memory block from main memory, cache coherency protocols have been developed to ensure that no processor relies on a memory block that has become stale, typically due to a modification or update performed to the block by some other processor. Many cache coherency protocols associate a state with each cache line. A given memory block, for example, may be in a shared state in which copies of the block may be present in the caches associated with multiple processors. When a memory block is in the shared state, a processor may read from, but not write to, the respective block. To support write operations, a memory block may be in an exclusive state. In this case, the block is owned by a single processor which may write to the cache line. When the processor updates or modifies the block, its copy becomes the most up-to-date version, while corresponding copies of the block at main memory and/or other processor caches become stale.

There are two classes of cache coherency protocols: snooping and directory based. With snooping, the caches monitor or snoop all transactions traversing the shared memory bus, looking for transactions that reference a memory block stored at the cache. If such a transaction is detected, the cache updates the status information for its copy of the memory block based on the snoop transaction. In this way, every cache that has a copy of a given memory block also has a copy of the status information of that block. With a directory based protocol, the state of each block is kept in a single, centralized location in the system, called a directory. Status information is not maintained in the individual caches.

FIG. 1 is a highly schematic illustration of a prior art directory 100. Directory 100 has a plurality of entries 102*a–d* each of which corresponds to a respective memory block. The directory 100 is organized, moreover, such that each entry 102*a–d* has a plurality of fields or cells for storing state and/or status information for the respective block. In particular, the directory 100 has an address column 103 that stores the address of the memory block, an owner column 104 that stores the identity of the entity, e.g., a processor or main memory itself, that is considered to be the owner of the memory block, and a sharer column 106 that stores the identity of those processors or other system entities that have a shared copy of the block.

The sharer column 106 may have a plurality of sub-columns 106*a–c*, each of which may contain the identity of a particular processor that has a shared copy of the respective memory block. If a request for shared access to a memory block is received from a first processor, P1, main memory examines the directory entry, e.g., entry 102*c*, for the block to determine its owner. As memory is itself the owner of the block, memory sends its copy of the block to P1 and enters P1's identifier (ID) into one of the sharer fields, e.g. field 106b, of the respective directory entry, e.g., entry 102c, thereby noting that P1 has a shared copy of the block. Since P1 only requested shared access to the memory block, the contents of the entry's owner field 104 are not modified.

If P1 issues a request for exclusive or write access to some other memory block, e.g., the block corresponding to entry 102d, main memory again examines the contents of entry 102d. Suppose that, at the time the request is received, the owner field reflected that memory was the owner of the memory block as shown in parentheses. In this case, memory sends the block to P1, and replaces the contents of the owner field 104 with P1's ID to reflect that P1, rather than memory, is now the owner of the memory block. P1 may then modify or update the memory block. If a request from a second processor, P2, is subsequently received for a shared copy of this memory block, main memory examines entry 102d of the directory 100 and determines that P1 is the owner of the memory block. Because its copy of the block, i.e., the copy stored at main memory, may be stale, memory does not forward its copy to P2. Instead, memory may be configured to forward the request to P1 and add P2's ID to one of the sharer fields, e.g., field 106a. In response to the forwarded request, P1 may then satisfy P2's request by sending it a copy of the modified memory block from P1's cache. Alternatively, main memory may be configured to force P1 to relinquish ownership of the memory block and return the modified version to memory so that memory can send a copy of the up-to-date version to P2.

It has been recognized that a computer system's cache coherency protocol is a key factor in the system's ultimate performance. Poorly designed cache coherency protocols can result in latencies, bottlenecks, other inefficiencies and/or higher complexity, each of which may reduce performance and/or increase cost. Bottlenecks, for example, often arise in high occupancy controllers, such as directory controllers. "Occupancy" is a term of art and refers to the amount of time a controller is unavailable while it services a current request.

In some cache coherency protocols, when a directory controller receives a request corresponding to a memory block, it thereafter becomes unavailable to service other requests for that memory block until certain acknowledgements to the earlier request are received back at the directory controller. The stalling of later requests or references until the directory controller is once again available may degrade system performance. Thus, efforts have been made to design low occupancy cache coherency protocols, which allow multiple requests to the same memory block to be executing substantially simultaneously within the computer system.

As indicated above, cache coherency refers to what values can be returned by a read. A cache coherency protocol, moreover, ensures that two data processing entities will not have two different values for the same memory block. Data consistency, on the other hand, defines when a written value will be returned by a read. In other words, when will a written value be made available or "visible" to other data processing entities. As the only way to observe a written value is through a read, consistency refers to the ordering properties imposed among reads and writes.

The most straightforward model for memory consistency is called sequential consistency. In a sequentially consistent system, the result of any execution is the same as if the operations of all of the processors were executed in some sequential order, and the operations of each individual processor appear in this sequence in the order specified by its program. One way to implement sequential consistency is to delay each memory access until the previous memory access has been completed. Although it presents a simple programming paradigm, sequential consistency reduces performance especially in computer systems having large numbers of processors and/or long interconnect delays.

An improvement to sequential consistency is weak consistency. In a weak consistency system, an order is imposed between selected sets of memory reference operations while other operations are considered unordered. One or more memory barrier (MB) or fence operations are utilized to indicate the required order. All memory reference operations issued before the MB are ordered before all memory reference operations issued after the MB. However, no order is required on memory reference operations that are not separated by an MB. Thus, by issuing an MB operation a first processor is guaranteed to see the effect of an earlier write by a second processor to a selected memory block. The effects of the MB operation, however, can reach beyond the second processor's write. In particular, issuance of the MB operation also requires that the first processor see the effects of all writes that preceded the second processor's write. One way to implement such guarantees is to impose an obligation on later writes to ensure completion of all earlier writes. This is known as inheritance.

Because each processor must be able to ensure the completion of earlier writes issued by potentially all other processors in the system, current inheritance schemes do not scale well to computer systems having large numbers of processors. Specifically, current schemes can result in the addition of high capacity components or resources at each processor, some of which may rarely if ever be used. This can result in significant increases in system cost. Thus, a need exists for an efficient inheritance mechanism such that later writes can ensure the completion of earlier writes.

SUMMARY OF THE INVENTION

Briefly, the present invention relates to an active inheritance system and method for use a computer system, such as a shared memory, symmetrical multiprocessor (SMP) computer system, that allows later writes to efficiently guarantee the effects of earlier writes. When multiple data processing entities, such as processors, write to a given memory block, the entities cooperate to form a write chain linking all of the writes. Notably, each entity need only keep track of a single entity in the chain. As the writes are performed, the write chain is torn down such that each entity does not release the block to the next entity in the chain until the prior write is consistent. The SMP system may comprise one or more nodes each having a plurality of processors and a plurality of shared memory subsystems coupled together by an interconnect fabric. The memory subsystems are configured to store data in terms of memory blocks, and each processor preferably has a cache for storing copies of memory blocks being used by the processor. Each processor further includes a miss address file (MAF) that keeps track of outstanding requests for a memory block not currently stored in the processor's cache. Coupled to the MAF are one or more state machines so that the entries of the MAF can be transitioned among a plurality of states. The SMP system additionally includes a directory for maintaining coherency over the memory blocks, any one of which may be concurrently stored at multiple processor caches. In the illustrative embodiment, the directory has a plurality of entries each of which is assigned to a respective memory block. Each entry has an owner field that indicates whether some entity, e.g., a processor, or memory is the owner of the block, a sharer list field that indicates which entities, e.g., other processors, have a copy of the block in their caches, and a writer field that indicates which entity last wrote the block back to memory. The directory cooperates in the execution of a low occupancy cache coherency protocol that permits multiple references to the same memory block to be executing within the SMP system at substantially the same time.

In accordance with the invention, when multiple entities issue writes to a given memory block a write chain is formed by storing information, such as pointers, and state in the MAF entries of the entities writing to the given memory block. The information and state stored at the MAF entries is utilized by each respective entity in guaranteeing that all writes prior to the write of the current entity are complete before the current entity's write can complete. In the illustrative embodiment, each MAF entry has a write pointer field for storing the identifier (ID) of the next entity within the write chain. Additionally, each MAF entry has a write chain state field for storing the current write chain state of the MAF entry. The write chain state indicates the particular action to be taken by the entity regarding the block.

When an entity receives a requested memory block, it checks the write state of the MAF entry that was established for the block. If the entry is in the "inval pending" write chain state, the entity issues an Invalidate_Acknowledgement to the entity identified in the write pointer field. If the entry is in the "Read_Modify pending" write chain state, the entity issues a memory reference operation that includes a copy of the block, to the entity identified in the write pointer field. If the entry is in the "Full_Block_Write pending" write chain state, the entity returns an Invalidate_Acknowledgement command to the entity identified in the write pointer field. Each entity thus guarantees that the effects of all prior writes will occur before its write takes effect.

BRIEF DESCRIPTION OF THE DRAWINGS

The invention description below refers to the accompanying drawings, of which:

FIG. 1, previously discussed, is a highly schematic diagram of a conventional directory;

FIG. 5 is a highly schematic block diagram of a miss address file (MAF) entry;

FIG. 6 is a highly schematic block diagram of a cache tag entry;

FIG. 7 is a highly schematic block diagram of a command packet;

FIG. 8 is a highly schematic block diagram of the directory of the present invention;

FIG. 12 is an illustration of a MAF entry of an entity of FIG. 11.

DETAILED DESCRIPTION OF AN ILLUSTRATIVE EMBODIMENT

Figure 2:
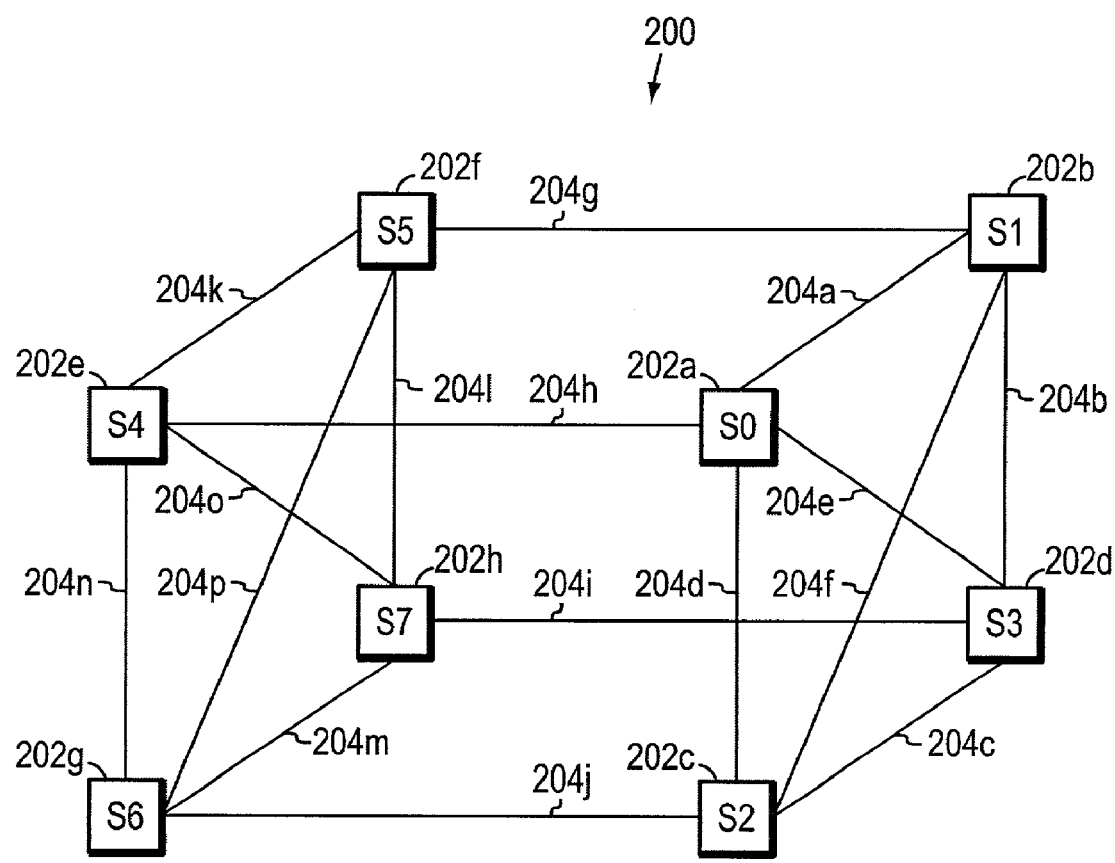
FIG. 2 is a highly schematic functional block diagram of a multi-processor node.

FIG. 2 is a highly schematic illustration of a preferred multiprocessor node 200 for use with the present invention. The node 200 comprises a plurality of, e.g., eight, sockets, S0–S7, which are designated by reference numerals 202a–h. The eight sockets 202a–h are logically located in three-dimensional space at the corners of a cube, and are interconnected by a plurality of inter-processor links 204a–p. Thus, each socket can communicate with any other socket of the node 200. In the illustrative embodiment, sockets forming two opposing sides of the node 200 are fully interconnected, while the two sides are connected only along the edges of the cube. That is, sockets S0–S3, which form one side of the cube, and S4–S7, which form the opposing side of the cube, are fully interconnected with each other, while the two opposing sides are connected by four inter-socket links 204g–j. As described herein, each socket includes one or more processors and has or is coupled to two main memory subsystems.

Figure 3:
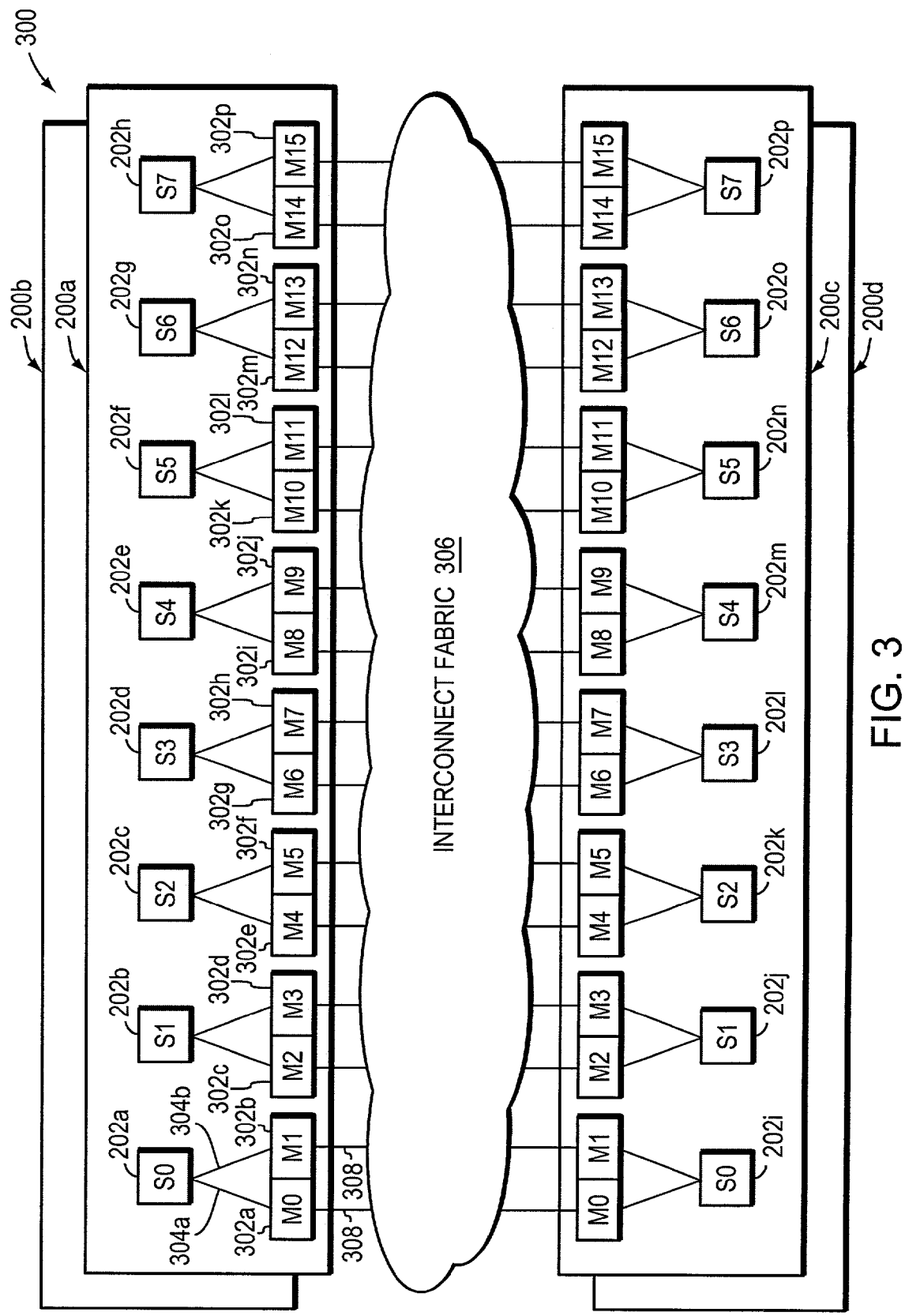
FIG. 3 is a highly schematic functional block diagram of a symmetrical multiprocessor (SMP) computer system formed from a plurality of multi-processor nodes.

FIG. 3 is a highly schematic illustration of a symmetrical multiprocessing (SMP) computer system 300 formed from a plurality of nodes. In particular system 300 comprises four nodes 200a–d, each of which is similar to node 200 (FIG. 2), although the inter-processor links have been omitted for clarity. As described above, each node, such as nodes 200a and 200c, has eight sockets, such as sockets 202a–h and 202i–p, respectively. Each node also includes a plurality of main memory subsystems. Preferably, each socket is coupled to a pair of memory subsystems, thereby providing sixteen memory subsystems at each node. At node 200a, the sixteen memory subsystems M0–M15 are designated by reference numerals 302a–p, and socket 202a is coupled to its pair of memory subsystems 302a and 302b by corresponding processor/memory links 304a and 304b.

The four nodes 200a–d, moreover, are fully interconnected with each other through an interconnect fabric 306. Specifically each memory subsystem, such as subsystems 302a and 302b, are connected to the interconnect fabric 306 by fabric links 308. In the preferred embodiment, each memory subsystem at a given node is coupled to its counterpart memory subsystem at the other three nodes. That is, memory subsystem M0 at node 200a is coupled by four fabric links to the M0 memory subsystem at the three other nodes 202b–d, memory subsystem M1 at node 200a is coupled by four fabric links to the M1 memory subsystem at the other three nodes 202b–d, and so on.

Figure 4:
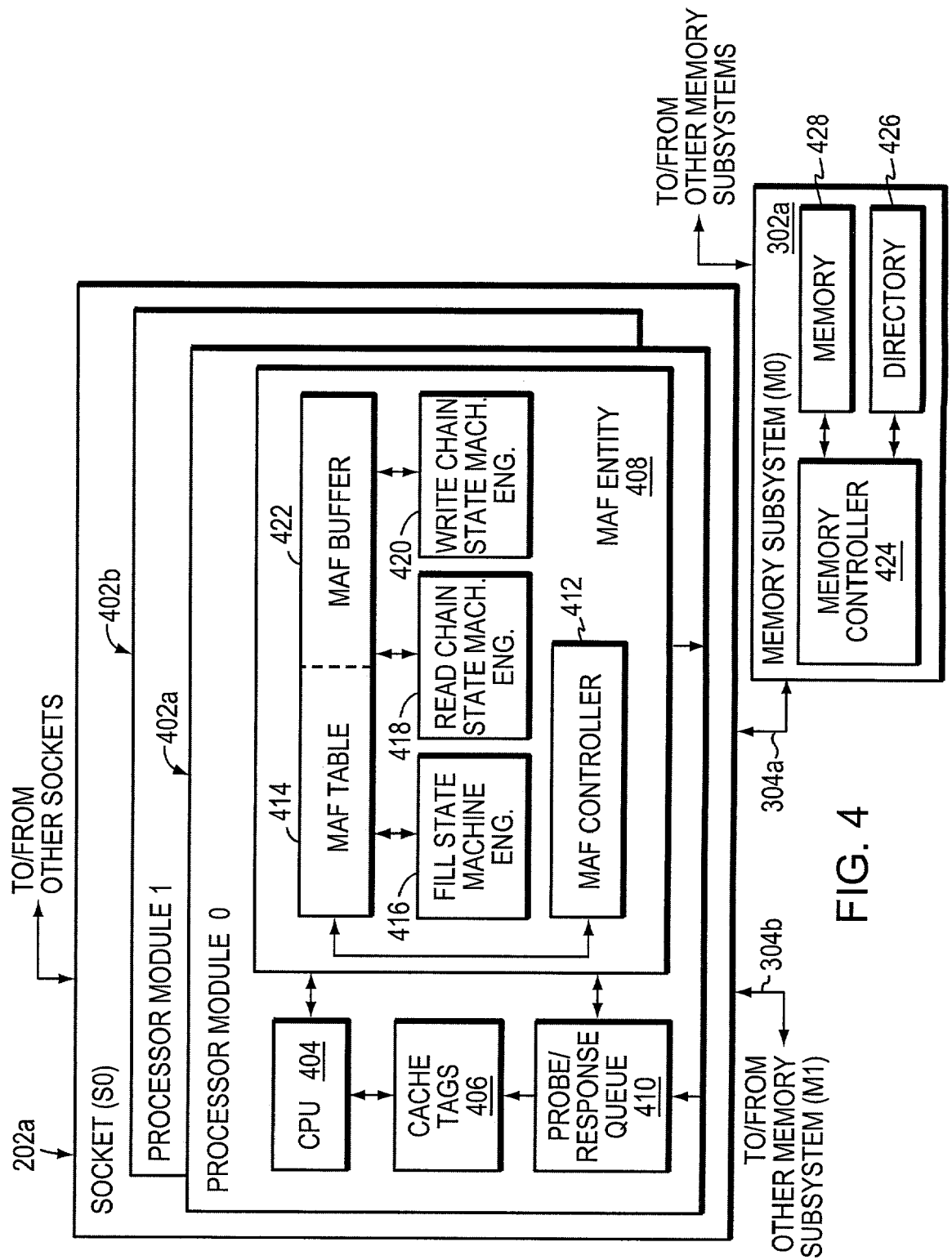
FIG. 4 is a highly schematic block diagram of a processor socket and memory subsystem of the SMP computer system of FIG. 3.

FIG. 4 is a highly schematic illustration of socket (S0) 202a, and one of its associated memory subsystems (M0) 302a. Socket 202a includes two processor modules 402a and 402b. Each processor module, such as module 402a, has a processor or central processing unit (CPU) 404, a cache tags storage device 406, a miss address file (MAF) entity 408 and a probe/response queue 410. The CPU 404 includes one or more processor caches (not shown) at one or more levels that are in close proximity to the CPU for storing data that the CPU 404 is currently using or is likely to use in the near future. The caches are organized into cache lines, and each cache line can store a memory block. Information regarding the status of the memory blocks stored in the processor cache(s), such as the address and validity of the block, is maintained in the cache tags storage device 406. Device 406 may also store information regarding memory blocks stored at processor registers.

The MAF entity 408, which keeps track of outstanding commands, such as memory reference requests, issued to the system for memory blocks not presently in the cache, has a MAF controller 412, a MAF table 414 and one or more state machine engines. In the illustrative embodiment, the MAF entity 408 has a fill state machine engine 416, a read chain state machine engine 418 and a write chain state machine engine 420. A section or area of the MAF table 414, moreover, may be organized as a buffer, such as MAF buffer 422. The MAF buffer 422 may be used to temporarily store memory blocks received in response to the memory reference requests issued by the CPU 404, and awaiting loading into a processor cache entry or processor register.

Processor module 402*b* similarly includes a CPU, a cache tags storage device, a MAF entity and a probe/response queue. Socket (S0) 202*a* is coupled to the other sockets (S1–S7) of node 200*a* by inter-socket links and to memory subsystems (M0) 302*a* and (M1) 302*b* by processor/memory links 304*a* and 304*b*, respectively.

It should be understood that each processor module 402 may include other components, such as a write back or victim buffer, a register file, a translation look-aside buffer (TLB), load/store (L/S) queues, etc.

CPU 404 may be and/or include any one of the processors from the Itanium architecture from Intel Corp. of Santa Clara, Calif., such as the Itanium® 1 or Itanium® 2 processors. Nonetheless, those skilled in the art will understand that other processors, such as the Hammer series of 64-bit processors from Advanced Micro Devices, Inc. (AMD) of Sunnyvale, Calif., may also be used.

The memory subsystem (M0) 302*a* has a memory controller 424, a directory 426 and one or more memory modules or banks, such as memory unit 428. The memory subsystems of nodes 200*a–d* combine to form the main memory of the SMP system 300 some or all of which may be shared among the processors. Each socket 202, moreover, includes a portion of main memory by virtue of its respective memory subsystems 302. Data stored at the memories 422 of each subsystem 302, moreover, is organized into separately addressable memory blocks that, as mentioned above, are equivalent in size to the amount of data stored in a processor cache line. The memory blocks or cache lines are of uniform, fixed size, and represent the smallest unit of data that can be moved around the SMP system 300. In the preferred embodiment, each cache line contains 128-bytes of data, although other fixed sizes, such as 64-bytes, could be utilized. Each memory address, moreover, maps to and thus identifies one and only one memory block. And, a plurality of address bits, such as the upper three address bits, are preferably employed to identify the "home" memory subsystem of the respective memory block. That is, each memory block, which is separately addressable by the SMP system 300, has a pre-determined home memory subsystem that does not change. Each directory, moreover, maintains status information for the memory blocks for which its memory subsystem is the home memory. In other words, rather than having a single, centralized directory, the "directory" for the SMP system 300 is distributed across all of the memory subsystems.

Memory unit 428 may be and/or may include one or more conventional or commercially available memory structures, such as dynamic random access memory (DRAM), synchronous DRAM (SDRAM), double data rate SDRAM (DDR-SDRAM) or Rambus DRAM (RDRAM) memory devices, among others.

It should also be understood that each socket 202 may further include one or more input/output (I/O) subsystems (not shown), such as an I/O bridge, that connects one or more I/O devices or peripherals to the SMP system 300. The I/O subsystems, moreover, may have their own private caches for buffering data, and the I/O devices may be granted access to some or all of the SMP system's main memory through the I/O subsystems. The processors and I/O subsystems may be referred to as data processing entities as they are configured to issue requests for memory blocks.

The MAF table 414 is organized at least logically as a table or array having a plurality of rows and columns whose intersections define cells for storing information. FIG. 5 is a highly schematic block diagram of an exemplary row or entry 500 of MAF table 414 (FIG. 4). Entry 500 has a plurality of fields including a 1-bit active field or flag 502, which indicates whether the respective entry 500 is active or inactive, i.e., whether the outstanding request represented by entry 500 is complete or not. A request that is not yet complete is considered active. Entry 500 further includes a command field 504 that specifies the particular command that is outstanding, and an address field 506 that specifies the memory address corresponding to the command. Entry 500 additionally includes an invalid count (Inval Cnt.) field 508, an acknowledgement count (Ack Cnt.) field 510, a read pointer (ptr.) field 512, a read chain state field 514, a write pointer field 516, a write chain state field 518, a Fill state field 520 and a write-done field 522.

Each state machine engine 416, 418 and 420 can transition a respective MAF entry 500 among a plurality of states. The Fill state machine engine 416 stores the current fill state of a MAF entry 500 in the Fill state field 520. The read chain state machine engine 418 stores the current read chain state in field 514, and the write chain state machine engine stores the current write chain state in field 518.

The cache tags storage device 406 (FIG. 4) is also organized at least logically as a table or array having a plurality of rows and columns whose intersections define cells for storing information. FIG. 6 is a highly schematic block diagram of an exemplary row or entry 600 of the cache tags storage device 406. As mentioned above, each entry of the cache tags storage device 406, including entry 600, corresponds to a particular cache line stored at the processor's cache(s). Cache tag entry 600 includes a tag field 602 that specifies the memory address of the respective cache line, and a series of status flags or fields, including a shared flag 604, a dirty flag 606 and a valid flag 608. The valid flag 608 or bit indicates whether the respective cache line has a copy of valid data in it, i.e., whether the data is coherent with the latest version of the block. The shared flag 606 or bit indicates whether more than one processor cache in the SMP system has a copy of the block. The dirty flag 608 or bit indicates whether the cache line has been modified or changed by the processor and is thus more up-to-date than the version stored at main memory. When a processor writes to a cache line, it sets the dirty flag 608 to indicate that this version of the block is now the latest version.

Virtual Channels

A CPU 404, I/O subsystem and memory subsystem 302 of the SMP system 300 may each be referred to generally as an "entity", and the entities of the SMP system 300 interact with each other by issuing "command packets" or simply "commands" to each other. Commands may be classified generally into three types: Requests, Probes and Responses. Requests are commands that are typically issued by a processor when, as a result of executing a load or store operation, it must obtain a copy of data. It should be understood that the term "data" as used herein is broadly defined to include instructions as well as data. Requests are also used to gain exclusive ownership or write access to a piece of data, e.g., a memory block. Requests include Read commands, Read_Modify (ReadMod) commands, Change_to_Dirty (CTD) commands, and Write_Back (WB) commands, among others. Probes are commands issued to one or more processors requesting data and/or cache tag status updates. Probe commands include Forwarded_Read (FRead) commands, Forwarded_Read_Modify (FRead-Mod) commands, and Invalidate (Inval) commands, among others. Responses are commands which carry requested data to a processor or acknowledge some request. For Read and ReadMod commands, the responses are Fill and Fill_Modify (FillMod) commands, respectively. For CTD commands, the responses are CTD_Success or CTD_Failure commands. For WB commands, the response may be a WB_Acknowledgement command.

FIG. 7 is a highly schematic, partial block diagram of a preferred form of a command packet 700. The command packet 700 is organized into a plurality of fields. Specifically, command packet 700 has a command field 702 which carries an operation code (opcode) indicating the type of command, e.g., Read, ReadMod, Fill, etc., the packet is. An address field 704 specifies the physical address of the memory block to which the command refers. A source identifier (ID) 706 specifies the entity that sourced or issued the command 700. A source MAF entry field 708 specifies the particular entry within the MAF table that has been established at the source entity for the command 700. A destination ID 710 specifies the intended recipient or target of the command 700. An Inval Count field 711 specifies the number of invalidate acknowledgements that are to be received. A version field 712, as described more fully below, can be used to specify a particular version of the memory block being requested. Command may further include a data field 714 for carrying a memory block, and an error correction code (ECC) field 716.

It should be understood that each processor of the system is preferably assigned a unique processor identifier (PID), and that each memory subsystem and I/O subsystem is also assigned a unique ID. For commands issued by a processor, the processor's PID is entered in the source ID field 706. For commands directed to a processor, the target processor's PID is entered in the destination ID field 708. For commands directed to memory, the destination ID field 708 is loaded with the ID assigned to the referenced memory block's home memory subsystem.

Memory reference operations, such as reads, are preferably executed by the SMP system 300 through a series of steps whereby each step involves the exchange of a particular command among the entities of the SMP system 300.

To avoid deadlock, the cache coherency protocol of the present invention utilizes a plurality of channels established within the SMP system 300. Preferably, the channels share physical resources and are thus "virtual" channels. Each virtual channel, moreover, is assigned a specific priority relative to the other virtual channels so that, by appropriately assigning the different command types to different virtual channels, the SMP system 300 can also eliminate flow dependence. In general, commands corresponding to later steps in a series are assigned to higher priority virtual channels than the commands corresponding to earlier steps.

In accordance with the present invention, the SMP system 300 maps commands into at least three (3) different virtual channels. A Q0 channel carries processor command packet requests for memory space read and write transactions. A Q1 channel accommodates probe command packets to Q0 requests. A Q2 channel carries response command packets to Q0 requests.

A suitable mechanism for implementing virtual channels in a large SMP system is described in U.S. Pat. No. 6,014,690, issued Jan. 11, 2000 for EMPLOYING MULTIPLE CHANNELS FOR DEADLOCK AVOIDANCE IN A CACHE COHERENCY PROTOCOL, which is hereby incorporated by reference in its entirety.

Those skilled in the art will recognize that other and/or additional virtual channels could be defined. The three virtual channels described above, moreover, can be configured to carry other types of command packets. The Q0 virtual channel, for example, may also accommodate processor command request packets for programmed input/output (PIO) read and write transactions, including control status register (CSR) transactions, to input/output (I/O) address space. Alternatively, a QIO virtual channel having a priority below the Q0 virtual channel can be defined to accommodate PIO read and write transactions.

In the illustrative embodiment, the processors and memory subsystems of the SMP 300 system cooperate to execute a write-invalidate, ownership-based cache coherency protocol. "Write-invalidate" implies that when a processor wishes to modify a cache line, it causes copies of the cache line that may be located in other processors' caches to be invalidated, rather than updating them with the new value. "Ownershipbased" implies there is always an identifiable owner for a cache line, whether it is memory, an I/O subsystem or one of the processors of the SMP system 300. The owner of a cache line, moreover, is responsible for supplying the most up-to-date value upon request. A processor may own a cache line "exclusively" or "shared". If a processor has exclusive ownership over a cache line, it may modify or update the cache line without informing the system. Otherwise, it must inform the system and potentially invalidate copies located in other processors' caches.

Directory 426, like the MAF, is also organized at least logically as a table or array having a plurality of rows and columns whose intersections define cells for storing information. FIG. 8 is a highly schematic block diagram of directory 426. Directory 426 is preferably organized into two regions or areas, a main directory region 802 and a write-back directory region 804. A plurality of rows 806-710 span both regions 802 and 804 of the directory 426. Several versions of row 806, which are described below, are shown. Within each region 802 and 804, a plurality of columns are defined for specifying the type of information stored in the directory's entries. The main directory region 802, for example, has an owner/sharer column 814 for storing the identifier (ID) assigned to the entity that owns the cache line, and a sharer list column 816 for indicating which entities, if any, have a shared copy of the cache line.

The sharer list column 816 is preferably configured to operate in one of two different modes. In a first mode, sharer list column 816 is organized into two sharer columns 816a and 816b each of which can store the ID assigned to a single entity, such as a processor, of the SMP system 300 that has a shared copy of the respective cache line. If a third entity is to be added as a sharer, the sharer list column 816 converts from two sharer columns 816a and 816b to a single coarse sharer vector column 816c. Each bit of the sharer vector column 816c corresponds to and thus identifies a set of one or more sockets 202 of system 300. If a bit is asserted, then at least one processor located within the set of sockets associated with the asserted bit has a copy of the respective cache line. The set of sockets may or may not correspond to a node. Entries 807 and 809 illustrate the first mode, and entries 808 and 810 illustrate the second mode. Main region 802 further includes an unused column 818 and an error correction code (ECC) column 820 for storing an ECC value calculated for the data in fields 814–818.

The write-back region 804 has a writer column 822, an unused column 824 and an ECC column 826. As explained herein, the contents of the owner/sharer column 814 of the main region 802 together with the contents of the writer column 822 of the write-back region 804 determine who owns the respective cache line and thus where the most up-to-date version is located within the SMP system 300. The ECC column 826 stores an ECC value calculated for the data in fields 822 and 824.

The unused fields 818 and 824 are provided in order to support modifications to the protocol and/or increases in the size of the address or other fields. It should be understood that one or more bits of unused column 814 may be used to signify whether the corresponding entry's sharer list 816 is in individual sharer mode, i.e., fields 816a and 816b, or in coarse sharer vector mode, i.e., sharer vector field 816c.

In the preferred embodiment, directory 426 is actually located within the memory unit 428 itself along with the memory blocks, and is not a separate memory component. That is, each memory address indexes to an area of the memory device 422 that is preferably divided into three regions. The first region corresponds to the main directory region, the second region corresponds to the write-back region, and the third region corresponds to the data contents of the memory block.

In the illustrative embodiment, the owner/sharer field 814 is 10-bits, the sharer list field 816 is 16-bits, thereby supporting either two 8-bit sharer IDs or one 16-bit coarse sharer vector, and the unused and ECC fields 818, 820 are each 7-bits. The main directory region 802 of a memory area is thus 5-bytes. For the write-back region 804, the writer field is 9-bits, the unused field 824 is 1-bit and the ECC field 826 is 6-bits, thereby making the write-back region 2-bytes. The third region includes the cache line, which may be 128-bytes, and a 9-byte ECC field (not shown) calculated for the memory block for a total of 137-bytes. Accordingly, for each memory block, the memory area comprises 144-bytes of information in total.

As mentioned above, each CPU 404 of the SMP system 300 may access portions of memory stored at the two memory subsystems 302 coupled to its socket, i.e., a "local" memory access, or at the memory subsystems coupled to any other socket of the SMP system 300, i.e., a "remote" memory access. Because the latency of a local memory access will differ from the latency of a remote memory access, the SMP system 500 is said to have a non-uniform memory access (NUMA) architecture. Further, since the system 300 provides coherent caches, the system is known as a cache-coherent NUMA (CC-NUMA) system.

Operation of the Distributed Directory

Each memory subsystem 302 preferably includes a built-in, self test (BIST) engine (not shown) that is used during initialization of the subsystem. The BIST engine initializes the contents of the memory device 422, including the directory contents and ECC values, by setting them to predetermined values as one of the final steps of the self test. It should be understood that firmware, rather than or in addition to a BIST engine, may be used for initialization purposes.

As data is brought into the SMP system 300, it is loaded into the memory devices 422 of the memory subsystems 302 in units of memory blocks. As each memory block is stored at a memory subsystem 302, the memory controller 424 computes a first error correction code (ECC) value for the block which is stored along with the cache line as described above. Data may be brought into the memory subsystems 302 from any number of sources, such as floppy disk drives, hard disk drives, tape drives, optical or magnetooptical drives, scanners, sound cards, etc. The memory controller 424 also loads the owner/sharer field 814 in the main region 802 and the writer field 822 in the write-back region 804 with the same value, preferably the ID assigned to the memory subsystem. The remaining fields of each entry are preferably de-asserted and/or set to null, e.g., to zero. The memory controller 424 also computes a second ECC value for the information in the main directory region 802, and a third ECC value for the information in the write-back region 804. The second ECC value is stored in ECC field 820 while the third ECC value is stored in ECC field 826. Entry 806a illustrates how a directory entry would appear upon initialization of the memory subsystem.

Read Command

Suppose a processor, e.g., processor P0, of the SMP system 300 wishes to read a memory block that is not present in its cache. Processor P0 preferably issues a Read command on the Q0 virtual channel specifying the address of the desired memory block. Processor P0 also directs MAF entity 416 to create an entry in the MAF table 414 for this request. MAF entity 416 asserts the active flag 502, loads the command field 504 with the opcode associated with a Read command and enters the block's address in the address field 506. MAF engine 412 transitions the state associated with the entry and reflected in MAF state field 520 from the idle state to the active state. The remaining fields of the MAF entry 500 may be de-asserted. The SMP system 300 routes the Read command from processor P0 to the home memory subsystem for the specified memory block, e.g., subsystem 302a.

At the home memory subsystem 302a, the memory controller 424 accesses the area of memory device 422 specified by the address contained in the Read command, and retrieves the directory entry, e.g., entry 806a, for the block. The memory controller 424 first examines the information stored in the owner/sharer field 814 and the writer field 822 of the identified entry 806a. Because the contents of both the owner/sharer field 814 and the writer field 822 are the same, i.e., memory, the memory controller 424 concludes that it is the owner of the cache line, and that the version stored at its memory device 422 is the most up-to-date version. Accordingly, the memory controller 424 responds to the Read command by sending processor P0 a copy of the block from memory device 422.

Specifically, the memory controller 424 issues a Fill command on the Q2 virtual channel that includes the address and data of the requested block. The memory controller 424 also adds P0's PID to the list of sharers maintained in the sharer column 816. Assuming P0 is the first entity to request a shared copy of the cache line, memory controller 424 enters P0's PID into sharer field 816a. As P0 has only requested a shared copy of the cache line, the memory controller 424 does not modify the contents of the owner/sharer field 812. The memory controller 424 also does not modify the contents of the writer field 822. Entry 806b (FIG. 8) illustrates how entry 806a would appear following the updates performed by the memory controller 424 in response to the Read command from P0.

It should be understood that, when a memory block is read out of a memory device 422, the memory controller 424 preferably checks parity information, e.g., a parity bit, to determine whether the retrieved data has been corrupted. If so, the memory controller 424 utilizes the previously computed ECC value to recover the data. The recovered data is then sent to the requesting entity. The recovered data may also be loaded back into the memory device 422, overwriting the corrupted data. Controller 424 also checks a parity bit when reading information from the main directory region 802. And, if the information in the main directory region 802 is updated, such as by adding P0 to the sharer list 816, the memory controller 424 computes a new ECC value and stores it in ECC field 820.

In some SMP systems that use ordered Q1 commands, a fill marker mechanism is employed to inform a processor that its request, such as a Read command, has accessed the home memory's directory, and that the requested data is in the process of being returned to the processor. Typically, the fill marker mechanism is implemented through the issuance of a separate Marker command by the memory subsystem to the processor upon access to the directory. In the illustrative embodiment, memory controller 424 does not send a separate Marker command message in response to Read commands. Nonetheless, those skilled in the art will recognize that a fill maker mechanism could be implemented by SMP system 300.

At processor P0, the Fill command is received at the probe/response queue 410, and the MAF engine 412 retrieves the entry from MAF table 414 corresponding to the received Fill command. The MAF engine 412 transitions the state reflected in the MAF state field 520 from the active state to the idle state, and the matching entry is rendered inactive by de-asserting the active flag 502. The data included with the Fill command is loaded into P0's cache and the respective entry 600 of the cache tags storage device 406 is up-dated. Specifically, the tag field 602 is loaded with the address of the received block, the shared and valid flags 604 and 608 are asserted and the dirty flag 606 is de-asserted.

ReadMod Command

Suppose that, instead of wanting just read access to a cache line, processor P0 wishes to obtain write access over a cache line that is not present in its cache.

In this case, processor P0 preferably issues a Read_Modify (ReadMod) command on the Q0 virtual channel specifying the address of the desired cache line. Processor P0 also directs MAF entity 416 to establish an entry in the MAF table 414 for the outstanding ReadMod command. MAF entity 416 asserts the active flag 502, loads the command field 504 with the opcode associated with a ReadMod command, and enters the address of the block in the address field 506. In addition, MAF entity 416 transitions the state as reflected in MAF state field 520 from the idle state to the active state. The remaining fields of the MAF table entry 500 may be de-asserted. System 300 routes the ReadMod command from processor P0 to the block's home memory subsystem 302a.

At memory subsystem 302a, the memory controller 424 accesses the area specified by the address of the ReadMod command, and retrieves the corresponding directory entry, i.e., entry 806a. The memory controller 424 first examines the information stored in the owner/sharer field 814 and the writer field 822 of the identified entry 806a. Because the contents of both the owner/sharer field 814 and the writer field 822 are the same, i.e., they both indicate memory, the memory controller 424 concludes that it is the owner of the block, and that the version stored at its memory 428 is the most up-to-date version. The memory controller 424 also checks the sharer column 812 to see whether any other entities have a shared copy of the requested cache line. In this case, no entities have a shared copy of the cache line. Accordingly, the memory controller 424 responds to the ReadMod command by sending processor P0 a copy of the block from its memory device 422.

Specifically, the memory controller 424 issues a Fill_Modify (FillMod) command on the Q2 virtual channel that includes the address and data of the requested block. Because P0 is requesting write access to the block, the memory controller 424 inserts P0's PID into the entry's owner/sharer field 814 replacing the current value, i.e., memory. Nonetheless, the memory controller 424 does not modify the contents of the entry's writer field 822. Entry 806c (FIG. 8) illustrates how entry 806a would appear following the updates performed by the memory controller 424 in response to the ReadMod command from P0.

If, at the time the ReadMod command is received at the memory controller 424, the sharer column 812 of entry 806a indicated that one or more entities have a shared copy of the block, the memory controller 424 would issue an Invalidate (Inval) command on the Q1 virtual channel to each such entity directing them to invalidate their copies of the block. Supposing there were two such entities, the memory controller 424 would also have set an invalid count within the FillMod command to two. When the FillMod command is received at P0, the corresponding MAF entry is located and the Inval Count field 508 is set to two as specified by the FillMod command.

In response to the Inval commands from the memory controller 424, the other entities invalidate their copies of the cache line and send Invalidate_Acknowledgement (IAck) commands on the Q2 virtual channel to P0. In response to each IAck command, P0 increments the Ack Count field 510 of the respective MAF entry 500 by one. The MAF engine 412 continuously checks the values of the Inval Count and Ack Count fields 508 and 510. When the two values are the same, indicating that each and every entity that had a shared copy of the cache line has invalidated its copy, P0 considers the block to be consistent and available to it for processing.

Suppose, after granting P0 write access over the block, another processor, e.g., processor P1, issues a Read command for the block. The Read command is routed by the SMP system 300 to memory subsystem 302a which is the block's home memory. The memory controller 424 locates the directory entry, i.e., entry 806c, corresponding to this cache line and examines the information stored in the owner/sharer field 814 and the writer field 822 of the identified entry 806a. As the owner/sharer field 814 indicates P0 and the writer field 822 indicates memory, the two values are not the same. In this case, the memory controller 424 concludes that the entity specified in the owner/sharer field 814, i.e., P0, rather than the memory subsystem itself, is the owner and has the most up-to-date version of the block. Accordingly, the memory controller 424 issues a Forwarded_Read (FRead) command on the Q1 virtual channel to P0. The memory controller 424 updates the sharer list column 816 for this directory entry to reflect that processor P1 has a shared copy of the block. The memory controller 424 does not, however, modify either the owner/sharer field 814 or the writer field 822. Entry 806d (FIG. 8) illustrates how entry 806c would appear following the updates performed by the memory controller 424 in response to the Read from P1.

P0 responds to the FRead by sending a copy of the block from its cache to P1 on the Q2 virtual channel.

ReadMod Command with other Processor as Owner

Suppose a third processor, P2, now issues a ReadMod command for this same memory block. The ReadMod is routed by the SMP system 300 from processor P2 to memory subsystem 302a which is the block's home memory. The memory controller 424 accesses the area of memory device 422, and retrieves the directory entry, i.e., entry 806*d*, corresponding to the block. Controller 424 then examines the information stored in the entry's owner/sharer field 814 and writer field 822. As the two values are not the same, the memory controller 424 concludes that P0, rather than the memory subsystem itself, is the owner and thus has the most up-to-date version of the block. Memory controller 424 also examines the sharer list column 816 and determines that P1 has a shared copy of the block. In this case, the memory controller 424 issues a Forwarded_Read_Modify (FReadMod) command on the Q1 channel to P0, and an Inval command on the Q1 channel to P1. In the illustrative embodiment, the FReadMod command also carries an inval count of two. The memory controller 424 also updates the directory entry to reflect that P2 is now the owner/sharer of the block and that there are no sharers. The memory controller 424 does not modify the writer field 822. Entry 806*e* (FIG. 8) illustrates how entry 806*d* would appear following the updates performed by the memory controller 424 in response to the ReadMod command from P1.

In response to the FReadMod command, P0 issues a FillMod command that includes the block on the Q2 virtual channel to P2. The FillMod command preferably has an Inval Count of two, reflecting that there are two entities with a copy of the cache line, i.e., P0 and P1. P0 also invalidates its copy of the cache line by de-asserting the cache tag entry's valid flag 608, and sends P2, either individually or as part of the FillMod command, an IAck command on the Q2 channel. In response to the Inval command, P1 also invalidates its copy of the cache line and sends an IAck command to P1. As each IAck command is received at P1, its MAF engine 412 increments the Ack Count field 510 of the corresponding MAF entry 500 by one. When the Inval Count and Ack Count fields 508 and 510 are equal, the cache line is considered to be consistent and may be processed, e.g., read and/or modified, by P2.

Write Back Command

When P2 is finished with the cache line, it writes the cache line back to its home memory subsystem 302*a* in order to make room in its cache for other cache lines. In the illustrative embodiment, the processor module 402*a* (FIG. 4) does not include a separate write-back or victim buffer. Instead, a cache line that is being victimized from the processor's cache is written-back to memory directly from the cache.

When a processor, such as P2, wishes to write-back a cache line over which it has write access, it first checks the corresponding tag entry 600. Specifically, P2 confirms that the dirty flag 606 and the valid flag 608 are both asserted, thereby indicating that P2 is the owner of the cache line to be written back and that the cache line is still valid. Only those memory blocks that were acquired by a processor with a request for exclusive or write access may subsequently be written back to main memory. If the dirty flag 606 is not asserted and/or the cache line is invalid, P2 is precluded from writing the cache line back to memory. P2 also checks its MAF table 414 to see if a MAF entry 500 already exists for the cache line to be written back. If there is a MAF entry 500, P2 confirms that the entry is inactive, that there are no outstanding IAcks for the cache line, i.e., that the Inval Count field 508 equals the Ack Count field 510, that the read pointer and write pointer fields 512 and 516 are both invalid, and that the MAF state field 520 is set to the idle state. If there are one or more outstanding IAcks or the MAF entry is active, the processor is precluded from writing the cache line back to memory.

Assuming the cache line is valid and dirty, and that MAF entry satisfies the above checks, a processor, such as P2, simply issues a Write_Back (WB) command to main memory in order to write the block back to memory. The WB command, which includes the modified block and its address, is preferably issued on the Q0 virtual channel. The tag entry 600 may then be invalidated and the entry made available to store a new cache line. No copy of the cache line being written back is kept at processor P2 upon issuance of the WB command. In the preferred embodiment, the processor P2 also creates a new entry 500 in the MAF table 414 for the WB command. The processor P2 asserts the active field 502, enters the opcode associated with the WB command into the command field 504 and enters the block's address into the address field 506.

The WB command is routed by the SMP system 300 to the block's home memory subsystem 302*a*. At the memory subsystem 302*a*, the memory controller 424 responds to the WB command by storing the modified data appended to the WB command in memory device 422 overwriting the previous contents of the memory block. The memory controller 424 also updates the directory entry's write-back region 804. Specifically, the writer field 822 of the directory entry, i.e., entry 806*e*, for the block being written back is updated with the PID of the processor that issued the WB command, i.e., processor P2. Significantly, neither the memory controller 424 nor the processor make any change to the directory entry's owner/sharer field 814. Entry 806*f* (FIG. 8) illustrates how entry 806*e* would appear following the write-back operation by P2.

In addition to storing the modified data at the memory device 422, the memory controller 424 preferably computes a new ECC value for the data and stores this new ECC value along with the block. Furthermore, because it has changed the contents of the write-back region 804, the memory controller 424 also computes a new ECC value for the information in region 804 and stores this new value in the ECC field 826.

After updating the entry's writer field 822, the memory controller 424 returns a WB_Acknowledgement (WB_Ack) command to P2. The WB_Ack is preferably issued on the Q2 virtual channel, although it may alternatively be issued on the Q1 virtual channel. In response to receiving the WB_Ack command, P2 causes the MAF entry 600 that was created for the WB command to be deactivated, e.g., by de-asserting the active field 502.

Suppose that, following P2's write-back of the block, some other processor in the SMP system 300, e.g., processor P3, now issues a Read command for the block. As described above, the Read command is routed by the SMP system 300 to the block's home memory subsystem 302*a*. The memory controller 424 responds to the Read command by accessing the directory entry, i.e., entry 806*f*, for the block. The memory controller 424 compares the contents of the owner/sharer field 814 with the contents of the writer field 822. Because the WB command from P2 modified the writer field 822 but not the owner/sharer field 814, the values in the two fields are now the same, i.e., they both contain P2's PID. As the values stored in the two fields 814, 822 are the same, the memory controller 424 concludes that it is the owner of the requested block, and that it has the most up-to-date version in its memory device 422. Controller 424 reaches this conclusion even though the owner/sharer field 814 does not indicate memory as the owner of the block. Because the two fields 814, 822 contain the same value, the memory controller 424 responds to the Read command from processor P3 by issuing a Fill command on the Q2 channel which includes a copy of the block taken from its memory device 422. The memory controller 424 also updates the directory entry by adding P3 to the sharer list field 816. The memory controller 424 does not modify either the owner/sharer field 814 or the writer field 822. Entry 806g (FIG. 8) illustrates how entry 806f would appear following the Read command from processor P3.

Except for the condition noted below, the writer field 822 of the directory's write-back region 804 is only modified in response to a WB command from a processor (or other system entity) performing a write-back of data to memory. The WB command, moreover, does not result in the contents of the owner/sharer field 814 being read or modified. The memory controller 424, moreover, updates the contents of a directory entry immediately in response to the received command, e.g., Read command, ReadMod command, WB command, etc. Such updates are not dependent upon the memory controller 424 receiving additional information, such as ACKs, from system entities.

It should be understood that write-backs must be strictly serialized. That is, at any point in time, the cache coherency protocol ensures that only a single processor can issue a WB command for a given memory block. In the illustrative embodiment, this is accomplished by permitting only a single entity to have write or exclusive access to a given memory block. A second entity requesting write access over the given memory block is not granted such access until the previous owner has either been invalidated or has written the memory block back to main memory. Accordingly, at any given point in time, the cache coherency protocol permits only a single entity to issue a WB command for a given memory block.

Invalidate to Dirty

As indicated above, a memory block or cache line, which may be 128-bytes, is the minimum unit of information, e.g., data and/or instructions, that is moved about the SMP system 300. When an entity intends to write to something less than a full memory block, such as a quadword which is 32-bytes, it typically issues a ReadMod command, and in response receives the full memory block including the 32-bytes of interest. The entity then writes the new data to the identified quadword, leaving the remaining portions of the memory block unchanged. The entire memory block, including the modified quadword, can then be written back to main memory. If an entity, such as a processor or an I/O subsystem on behalf of a peripheral device, intends to write the entire contents of a memory block, e.g., in connection with a direct memory access (DMA) write transaction, it may issue an Invalidate_to_Dirty (I2D) command. Since the entity is writing to the entire memory block, it does not care what the current version of the memory block is.

When an I2D command is received at the block's home memory subsystem, the memory controller 424 retrieves the respective directory entry, and issues Invals to the owner and sharer(s), if any, thereby causing them to invalidate their copies of the block. The memory controller also enters the ID assigned to the source of the I2D command in the entry's owner field, and returns a Success command to the source of the I2D command. The Success command specifies how many entities had a copy of the block in their caches. Upon invalidating their copies of the block, the owner and sharers, if any, issue IAcks to the entity that sourced the I2D command. Once the source has received the Success command and an IAck from each entity that had a copy of the block, it can write the new data to memory by appending the modified data to a WB command. The memory controller responds to the WB command with a WB_Ack command.

Full Block Write

A Full_Block_Write (FBW) command, like an I2D command, is typically utilized by an I/O subsystem when performing a DMA write transaction. However, unlike the I2D, which does not carry data, the FBW command carries the new memory block being written. At the home memory subsystem, the memory controller 424 retrieves the respective directory entry. The memory controller 424 issues Invals to the owner and sharer(s), if any, thereby causing them to invalidate their copies of the block. The memory controller 424 also enters the ID assigned to the source of the FBW command in the directory entry's owner and writer fields and stores the data in main memory. The block's previous owner and sharer(s), if any, respond to the Invals by invalidating their copies of the memory block and issuing IAcks to the source of the FBW command. The source collects the IAcks for consistency purposes.

As shown, the processors 404 and directories 426 cooperate to execute a generalized low occupancy cache coherency protocol. The protocol is "generalized" in that it can support processors that share memory blocks that are in a dirty state as well as processors that are precluded from sharing memory blocks that are in the dirty state. A dirty-shared processor responds to a snoop read, e.g., a FRead command, identifying a block in the dirty state by sending a copy of the block from its cache to the source of the snoop read. The dirty-shared processor does not, in response to the snoop read, write a copy of the block back to main memory. Accordingly, multiple processors may have a "dirty" copy of a memory block in their caches, although only one processor, the owner, can write the block back to main memory. Non-dirty shared processors do not support dirty blocks being held in more than one cache. In particular, if a non-dirty shared processor receives a snoop read identifying a block in the dirty state, the processor typically writes the block back to main memory, thereby requiring the source of snoop read to obtain a copy of the block from memory. Alternatively, the non-dirty shared processor may return the dirty block to main memory but also forward a copy of the block from its cache to the source of the snoop read. As described in co-pending application Ser. No. 10/263,741, filed Oct. 3, 2002 and titled COMPUTER SYSTEM SUPPORTING BOTH DIRTY-SHARED AND NON-DIRTY-SHARED DATA PROCESSING ENTITIES, which is hereby incorporated by reference in its entirety, the illustrative cache coherency protocol supports both types of processors.

The protocol is also considered a "low occupancy" protocol, because of the following attributes. First, each command only has to access the directory 426 once. Second, directory changes are deterministic based on the current directory state and the type of the received command. That is, the resulting state or form of a directory entry is solely a function of the current state or form of the entry and the received command. Third, the directory 426 neither creates nor requires any transient states or the return of acknowledgements in order to maintain coherency. Accordingly, once the directory 426 has updated the appropriate fields and issued the required commands, e.g., ReadMods, Invals, etc., it can immediately process another command for the same memory block even though the previous commands have yet to reach their targets.

It should be understood that each memory controller 424 represents a serialization point for the memory blocks stored at its memory subsystem 302, as the memory controller 424 preferably processes one received command at a time.

However, in the SMP system 300 of the illustrative embodiment, there is no central or single serialization point for the entire shared memory.

In accordance with the preferred embodiment of the present invention, the virtual channels, i.e., the logic, fabric links, and other resources on which the virtual channels are built, must guarantee delivery of all commands within the SMP system 300. The cache coherency protocol assumes that all commands issued in connection with a memory reference operation will be received by their intended targets.

Early Race Condition

Suppose a plurality of system entities, such as processors, concurrently issue read or write requests directed to the same memory block. In the illustrative embodiment, requests are considered concurrent when they occur close enough in time that either the memory block being requested and/or all expected IAcks have yet to be received by one or more of the requesters. As indicated above, prior art systems responded to such early races by either stalling the requests issued by all but the first entity, until the first entity's request completed or by queuing the requests at the directory. The present invention resolves the early race without stalling any of the requesting entities and without queuing the requests at the directory. Instead, the resolution mechanism of the present invention involves the creation and subsequent tear down of one or more read chains and one write chain. Each read chain links all of the requests for read access to the same version of the memory block. The write chain links all of the requests for write access to the memory block. Significantly, the read chain(s) and write chain are built and torn down in the same order as the requests are processed at the directory. Accordingly, the resolution mechanism guarantees that the last entity in the write chain matches the owner specified in the directory entry, and that the entities in the last read chain match the list of sharers in the directory entry.

Information concerning each link in the read and write chains is stored in the processors' respective MAF entries. The combined information from all of the MAF entries thus describes the complete chains. The MAF entries also contain information used to tear down the chains as the various versions of the memory block are received at the processors. The read chain state machine 418 and the write chain state machine 420 both participate in the creation and tear down of the chains. As each processor is only required to store information regarding the next link in the chain(s), the resolution mechanism supports the creation of long chains and thus scales well to very large computer systems.

Figure 9:
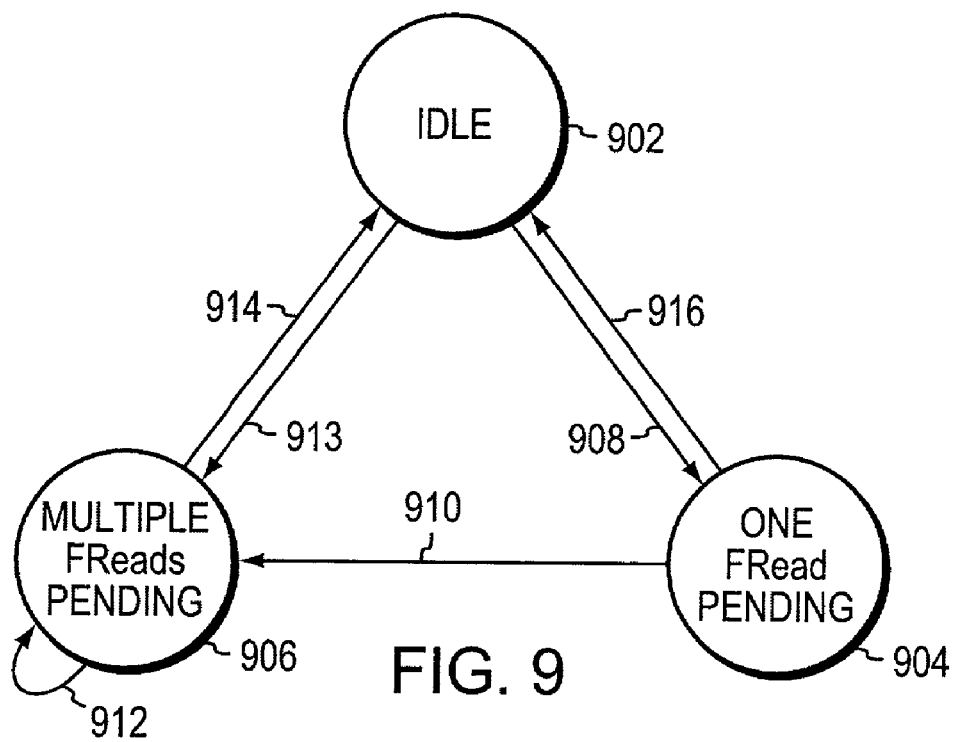
FIGS. 9 and 10 are state diagrams in accordance with the present invention.
Figure 10:
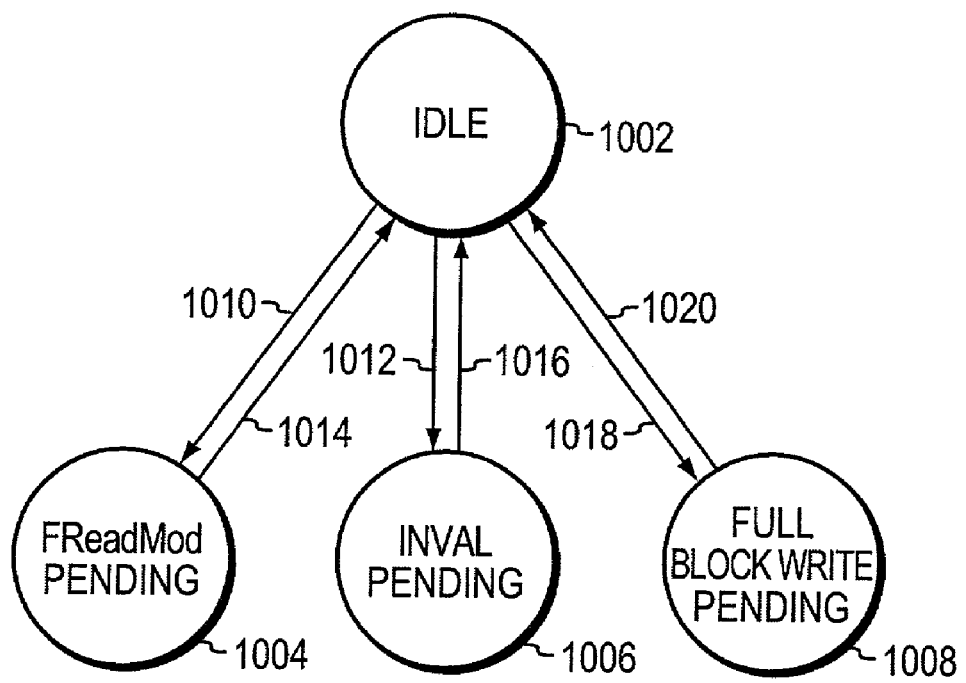

FIG. 9 is state diagram illustrating the states implemented by the read chain state machine 418. As indicated, the read chain state machine 418 can transition a given MAF entry among three states: an Idle state 902, a One_FRead_Pending state 904 and a Multiple_FRead_Pending state 906. FIG. 10 is a state diagram illustrating the states implemented by the write chain state machine 420. As shown, the write chain state machine 420 can transition a given MAF entry among four states: an Idle state 1002, a FReadMod_Pending state 1004, an Inval_Pending state 1006 and a Full_Block_Write_Pending state 1008. The arrows in FIGS. 9 and 10 show the permissible transitions among the states, which are described in more detail below.

The fill state machine engine 416 can transition a given MAF entry between an Idle state and an Active state.

Figure 11:
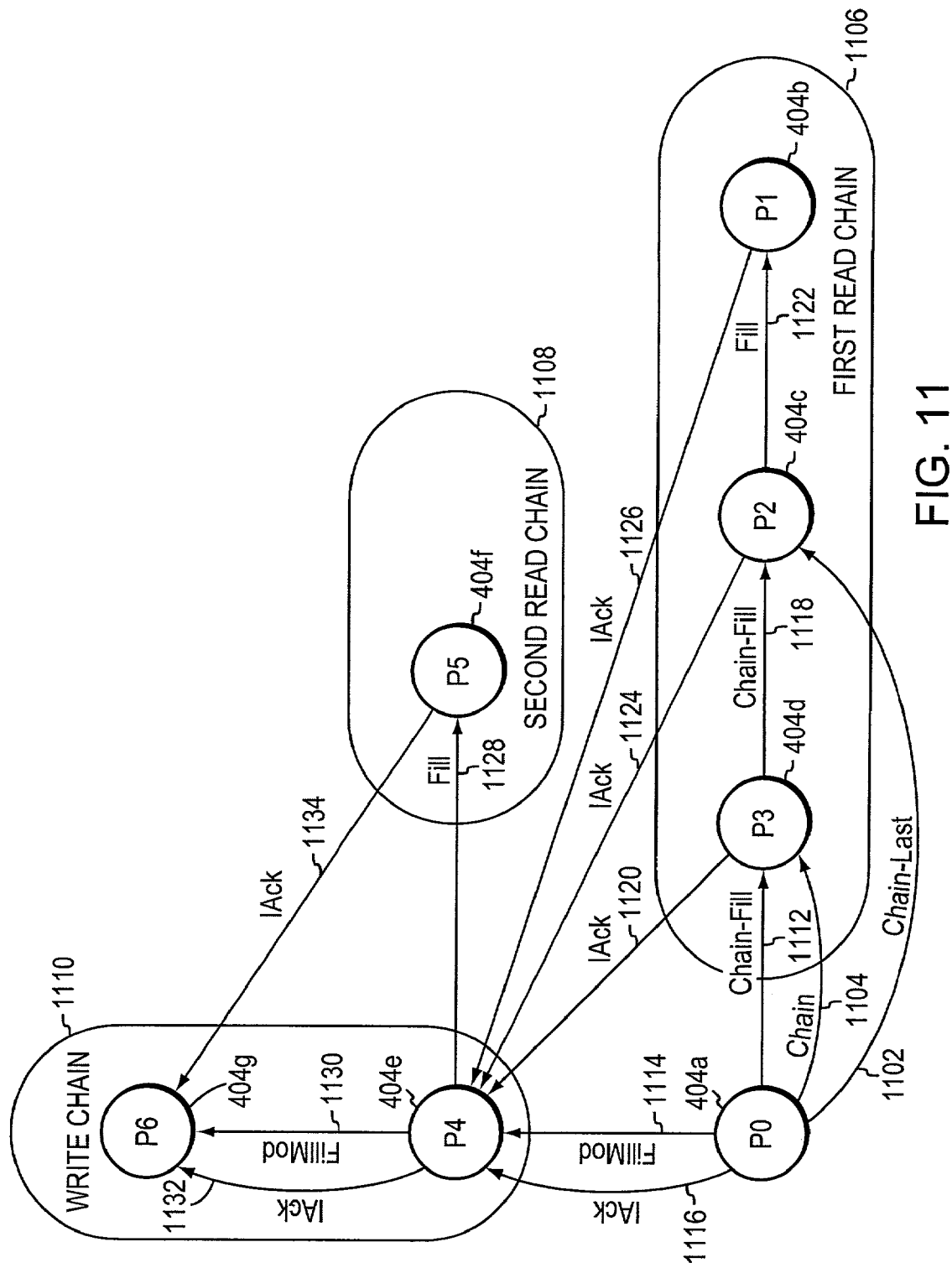
FIG. 11 is a highly schematic illustration of a preferred message sequence among a plurality of entities of the SMP computer system of FIG. 3.

FIG. 11 is a highly schematic illustration of the read and write chains that are created in response to a plurality processors requesting various versions of the same memory block. Suppose a processor, such as processor P0 also designated by reference number 404a, issues a ReadMod command for a given memory block that is not present in P0's cache. P0's MAF controller 412 creates a MAF entry for the ReadMod command. FIG. 12 is a highly schematic illustration of a MAF entry 1202, including sequential versions 1202a–g, created for the given memory block. Entry 1202a is the initial version of the MAF entry 1202 following the ReadMod command. As shown at fields 514 and 518, the read chain state machine 418 and write chain state machine 420 both start out in the Idle states 902, 1002. The fill state machine 416 as indicated at field 520 starts out in the active state.

At the given block's home memory subsystem, the memory controller 424 accesses the respective directory entry. Suppose the entry specifies some other processor, e.g., processor P30, as the owner, no sharers and memory as the last writer. In this case, the memory controller 424 issues a FReadMod command to P30 and enters P0's ID into the owner field. Suppose further that P30 is remote from P0 and that it takes significant time for P30 to receive the FReadMod and respond with a FillMod carrying the memory block. Meanwhile, another processor, such as processor P1 also designated by reference numeral 404b (FIG. 11), issues a Read command for the version of the memory block corresponding to P0's modification thereof. The Read is received at the home memory subsystem, which concludes that P0 is the block's owner. The home memory subsystem adds P1 as a sharer and issues a FRead command to P0. The FRead command is received at P0, which determines, based on the Fill state being in the active state and the lack of a cache entry, that it is still waiting to receive the memory block. Accordingly, P0 has no data to send to P1. To track P1's pending FRead, P0's read chain state machine 418 transitions the read state of MAF entry 1202a from the Idle state 902 to the One_FRead_Pending (One) state 904, as indicated by arrow 908 (FIG. 9), and updates the read chain state field 514 with this new state. It also loads P1's PID into the read pointer field 512 to create a read chain between P0 and P1, reflecting that P1 is waiting for a shared copy of the block from P0. MAF entry 1202b at P0 indicates how entry 1202a would appear following these updates.

Suppose that another processor, such as processor P2 also designated by reference numeral 404c (FIG. 11), similarly issues a Read command for the version of the memory block as modified by P0. At the home memory subsystem, the directory entry is modified to add P2 as another sharer, and a FRead command is issued to P0. As the memory block has still not arrived at P0 from P30, the FRead results in a miss at P0's cache, but hits on MAF entry 1202b. Because the FRead initiated by P2 corresponds to the second FRead for the memory block, P0's read chain state machine 418 transitions the read chain state for the MAF entry from the One_FRead_Pending state 904 to the Multiple_FReads_Pending (Multi) state 906, as indicated by arrow 910 (FIG. 9). The FRead initiated by P2 thus interposes P2 in the previous read chain from P0 to P1. That is, the read chain now goes from P0 to P2 and from P2 to P1. Accordingly, P0's MAF controller 412 in cooperation with the read chain state machine 418 replaces P1's PID in the read pointer field 512 with P2's PID. MAF entry 1202c indicates how entry 1202b would appear following these modifications.

P2, however, needs to be informed that its Read command created an intermediate link within a read chain for the version of the memory block corresponding to P0's modification. In the illustrative embodiment, P0 issues a chain building message, preferably a Chain_Last command 1102, to P2. The Chain_Last command 1102 is preferably issued on the Q2 virtual channel. The Chain_Last command 1102 indicates which entity is at the end of the respective read chain. In this case, Chain_Last command 1102 indicated P1 as being at the end of the chain. The Chain_Last command 1102 is received at P2's probe/response queue 410 and the corresponding MAF entry at P2 is accessed and modified. In particular, the read chain state of P2's MAF entry transitions from the Idle state 902 to the One_FRead_Pending state 904, and P1's PID is entered into the read pointer field.

Suppose that yet another processor, such as processor P3 as designated by reference numeral 404*d* (FIG. 11), also issues a Read command for the version of the memory block as modified by P0. At the home memory subsystem, the directory entry is modified to add P3 as yet another sharer, and a FRead command is issued to P0. Assuming the memory block has still not arrived from P30, the FRead results in a miss at P0's cache, but hits on MAF entry 1202*c*. Because the FRead initiated by P3 corresponds to the third FRead for the memory block, P0's read chain state machine 418 leaves the MAF entry in the Multiple_FReads_Pending state 906, as indicated by loop-back arrow 912 (FIG. 9). Nonetheless, the FRead initiated by P3 interposes P3 in the read chain between P0 to P1. That is, the read chain now goes from P0 to P3, from P3 to P2 and from P2 to P1. Accordingly, P0's read chain state machine 418 replaces P2's PID in the read pointer field 512 with P3's PID. MAF entry 1202*d* indicates how entry 1202*c* would appear following these modifications.

P0 also issues another chain building message, preferably a Chain command 1104, to P3 notifying it that it is part of a Read chain for this memory block. The Chain command 1104, which is also preferably issued on the Q2 virtual channel, carries the ID of the next entity in the chain. In this case, Chain command 1104 carries the PID of P2. In response to the Chain command 1104 from P0, P3 modifies its MAF entry for the memory block. Specifically, the read chain state transitions the MAF entry from the Idle state 902 directly to the Multiple_FReads_Pending state 906, as indicated by arrow 913 (FIG. 9). In addition, P2's PID is entered in the MAF entry's read pointer field.

If another processor or other entity requests read access to P0's version of the memory block, P0 would insert the new entity in the read chain by sending it a Chain message, similar to Chain command 1104, but identifying P3 as the next link in the chain from this entity.

Suppose instead, however, that another processor, e.g., P4 also designated by reference numeral 404*e* (FIG. 11), issues a request for write access to this same memory block. In other words, P4 issues a ReadMod command. The ReadMod is routed to the home memory subsystem which retrieves the directory entry for the block. The directory entry shows P0 as the owner, P1, P2 and P3 as sharers and memory as the last writer. The memory controller thus responds to the ReadMod from P4 by issuing a FReadlMod to P0 and Invals to P1, P2 and P3.

Assuming the memory block has still not arrived from P30, the FReadMod results in a miss at P0's cache, but hits on MAF entry 1202*d*. The FReadMod represents a request for write access to the memory block, unlike the earlier FReads which represented requests for read access. Here, P0's write chain state machine 420 transitions the write chain state of MAF entry 1202*d* from the Idle state 1002 to the FReadMod_Pending state 1004, as indicated by arrow 1010 (FIG. 10), and stores this new write chain state in field 518. State machine 420 also enters P4's PID in the write pointer field 516. MAF entry 1202*e* illustrates how entry 1202*d* would appear following the updates made in response to the FReadMod command initiated by P4.

The MAF entries at P1, P2 and P3 are also modified in response the Inval commands received at those processors. Specifically, the write chain state machine 420 at those processors transitions the respective MAF entries from the Idle state 1002 to the Inval_Pending state 1006, as indicated by arrow 1012. Additionally, P4's PID is entered into the write pointer field 516 of the MAF entries at P1, P2 and P3.

Suppose also that another entity, e.g., processor P5 also designated by reference numeral 404*f* (FIG. 11), issues a Read for the memory block that arrives at the directory after P4's ReadMod. In other words, when P5's Read reaches the home memory subsystem, the directory entry for the memory block reflects that P4 is the owner, that there are no sharers and that memory is the last writer. Accordingly, the memory controller adds P5 to the list of sharers and issues a FRead to P4. As shown, the directory's (or home memory subsystem's) response to P5's Read is the version of the memory block following P4's modification thereto, unlike the Reads from P1, P2 and P3 which were processed after P0's ReadMod but before P4's ReadMod and thus receive the version corresponding to P0's modification of the memory block.

As P4 has yet to receive the memory block from P0, the FRead misses P4's cache, but hits on the active MAF entry at P4. In response, P4 creates a second read chain for the memory block. This second read chain corresponds to the version of the memory block having P4's modification thereto. Specifically, the read chain state of P4's MAF entry transitions from the Idle state to the One_FRead_Pending state 904, and P5's PID is entered into the read pointer field.

Now, suppose that yet another entity, e.g., processor P6, issues a request for write access to the memory block. That is, P6 issues a ReadMod command. At the home memory subsystem, the directory entry is accessed which indicates that P4 is the owner, P5 is the only sharer and memory is the last writer. Accordingly, the memory controller issues a FReadMod command to P4 and an Inval command to P5.

As P4 has no memory block to send to P6, it responds to FReadMod command by extending the write chain, which currently extends between P0 and P4, out to P6. Specifically, P4's write chain state machine engine 420 transitions the write chain state of the MAF entry from the Idle state 1002 to the FReadMod_Pending state 1004, and enters P6's PID in the write pointer field. At P5, the write chain state of the respective MAF entry transitions from the Idle state 1002 to the Inval_Pending state 1006, and P6's PID is entered in the write pointer field.

With reference to FIG. 11, the issuance of the foregoing commands have established two read chains, a first read chain 1106 and a second read chain 1108, and one write chain 1110 for the memory block. First read chain 1106 comprises processors P3, P2 and P1 each of which is seeking a copy of the memory block that incorporates P0's modification thereto. Second read chain 1108 comprises processor P5 which is seeking a copy of the memory block that incorporates P4's modification thereto. The write chain 1110 comprises processors P4 and P6. P4 is seeking write access to the memory block following P0's modification thereto, while P6 is seeking write access to the block following P4's modification thereto. As shown, zero, one or more read chains can be created for a single memory block, while no more than one write chain can be created.

Suppose that, after the creation of the two read chains 1106 and 1108 and the one write chain 1110, P0 finally receives the memory block as part of a FillMod command from P30, which also sends an IAck Command. The FillMod and IAck commands are received at P0's probe/response queue 410 and MAF entry 1202e is accessed. The memory block may be temporarily stored at MAF buffer 422. The MAF entity's fill state machine 416 transitions the fill state of the MAF entry 1202e from the Active state to the Idle state, as the memory block has finally been received at P0. Because there were no sharers of the memory block, the FillMod command specifies an Inval Count value of one, which is loaded into the Inval Count field 508 of the MAF entry 1202e. Similarly, in response to the IAck command, the Ack Count field 510 is incremented by one, thereby making it equal to the Inval Count field 508. In the preferred embodiment, the memory block is then provided to CPU 404 for storage in its cache or a processor register and CPU 404 may perform its modification to the memory block, thereby allowing the thread or process executing at P0 to make forward progress and avoid livelock.

Upon completion of the write operation that caused P0 to issue the ReadMod command for the memory block, and the merging of the new data into P0's cache, P0 asserts the MAF entry's write-done field 522, assuming the MAF entry is still active. A MAF entry is kept active following the receipt of the fill data if either its write chain state or its read chain state (or both) is in something other than the Idle states 902, 1002. After asserting the write-done field 522, the MAF controller 412 then checks the read chain state and write chain state of the MAF entry 1202e, as reflected in fields 514 and 518, to see what further actions must be taken in connection with the memory block. As both the read chain state and the write chain state are in states other than the Idle state 902, 1002, the memory block, as updated by P0, must be propagated to the next entity in the first read chain 1106 and some action must taken in connection with the write chain 1110.

In the preferred embodiment, the MAF controller 412 periodically polls the Inval Count and the IAck Count fields 508, 510 to determine when they match. The MAF controller 412 also polls the write-done field 522 to determine when it becomes asserted, which then triggers the MAF controller 412 to begin (or to continue) tearing down or unrolling the read and write chains.

P0 checks the read chain state to determine the manner by which the block should be sent to the next entity in the read chain 1102. Here, MAF entry 1202e, as shown in field 514, is currently in the Multiple_FRead_Pending read chain state 906. Thus, P0 "knows" that there is more than one entity in read chain 1102. In this case, P0 sends the memory block as part of a chain data message, preferably a Chain_Fill command 1112 on the Q2 virtual channel, to the entity reflected in the read pointer field 512, i.e., to P3. The Chain_Fill command 1112 includes a copy of the memory block as modified by P0. Having satisfied its obligation as the head of the first read chain 1106, P0's read chain state machine 418 transitions the MAF entry's read chain state from the Multiple_FReads_Pending state 906 to the Idle state 902 as indicated by arrow 914. Thus, the chain data message, i.e., Chain_Fill command 1112, effectively tears down this portion of the first read chain 1106. MAF entry 1202f illustrates how entry 1202e would appear following P0's satisfaction of its requirements as part of read chain 1102.

The MAF controller 412 at P0 next checks to see whether a write chain has been created for this memory block. Specifically, controller 412 checks field 518 to see if MAF entry 1202f is in anything other than the Idle write chain state 1002. Here, MAF entry 1202f is in the FReadMod_Pending write chain state 1004. Thus, MAF controller 412 "knows" that the entity indicated in the write pointer field 516, i.e., P4, is expecting to receive a command granting P4 write access to the memory block. P0 responds by issuing a FillMod command 1114 to P4 on the Q2 virtual channel that includes a copy of the memory block as modified by P0. The FillMod command 1114 specifies the same Inval Count, i.e., four, as contained in the FReadMod command received by P0 from the home memory subsystem. Having satisfied its obligation as the head of the write chain 1106, P0's write chain state machine 420 transitions the MAF entry's write chain state from the FReadMod_Pending state 1004 to the Idle state 1002, as indicated by arrow 1014.

In addition, as P4 requested write access, P0 invalidates its copy of the memory block from its cache or processor register, and issues an IAck command 1116 to P4, thereby confirming P0's invalidation of the memory block. As the processing required for the memory block has been completed, the MAF controller 412 deactivates the entry 1202f, as reflected in the Active field 502. MAF entry 1202g illustrates how entry 1202f would appear following P0's satisfaction of its requirements as head of the write chain 1106 and the other required processing of the memory block.

It should be understood that in some system designs, P0 may not send a separate IAck to P4 and/or that the IAck may be included as part of the FillMod command.

Upon receipt of the Chain_Fill command 1112 from P0 at P3, the memory block as modified by P0 is temporarily stored at the MAF buffer 422, and the fill state machine engine 416 transitions P3's MAF entry from the active state to the idle state. As the Inval Count and Ack count fields at P3 are both zero, the block is moved from the MAF buffer 422 to P3's cache or a register and processed by P3. The MAF controller 412 also checks the read chain state field 514 and the write chain state field 516 to see whether P3 is part of a read or write chain for this memory block. As explained above, the read chain state field of P3's MAF entry indicates that the entry is in the Multiple_FRead_Pending state 906. The read pointer field 512, moreover, indicates P2. As a result, P3 sends the memory block to P2 as part of a chain data message, namely Chain_Fill command 1118 to P2. The read chain state of the MAF entry at P3 then transitions to the Invalid read chain state.

The write chain state field 518 at P3 reflects that the MAF entry is in the Inval_Pending write chain state 1006, and the write pointer field indicates P4. Accordingly, P3 also invalidates its copy of the memory block, and issues an IAck command 1120 to P4 thereby confirming P3's invalidation of the memory block. The write chain state machine 420 transitions the write chain state of P3's MAF entry from the Inval_Pending state 1006 to the Idle state 1002, as indicated by arrow 1016 (FIG. 10). As P3 is only reading the memory block (or some portion thereof) and is not writing to it, the write-done field of the MAF entry at P3 remains de-asserted. As the processing required for the memory block at P3 is then complete, the MAF controller 412 deactivates the entry, as reflected in the Active field 502.

The present invention utilizes a Chain_Fill command to pass data down a read chain from the head of the chain all the way to the next to last link in the chain in order to ensure that each recipient knows it is part of a read chain. This can be especially useful when the Chain_Fill command is received ahead of the chain building message, i.e., the Chain or Chain_Last command. For example, as described above, P0 issued Chain command 1104 to P3 in response to the FRead initiated by P3 and received by P0. Suppose, once the block was received at P0, that P3 received a regular or "vanilla" Fill command from P0 before receiving Chain command 1104. In this case, P3 might fill the data and then invalidate the memory block before ever learning that P3 is part of a read chain. This could result in a break in the chain, preventing P2 and P1 from ever receiving the memory block. If, on the other hand, P3 receives the memory block as part of a chain data message, then P3 knows to expect a chain building message with information regarding the read chain. P3 will thus hold onto the memory block so that it can forward it to the next link as identified in the chain building message that P3 will be receiving.

Upon receipt of the Chain_Fill command 1118 from P3 at P2, the memory block as modified by P0 is temporarily stored at the MAF buffer 422, and the fill state machine engine transitions the MAF entry from the active state to the idle state. As the Inval Count and Ack count fields at P3 are both zero, the block is moved from the MAF buffer 422 to P2's cache or a register and processed by P2. The MAF controller 412 also checks the read chain state field 514 and the write chain state field 516 to see whether P2 is part of a read or write chain for this memory block. As explained above, the read chain state field of P2's MAF entry indicates that the entry is in the One_FRead_Pending read chain state 904. The read pointer field 512, moreover, indicates P1. As a result, P2 sends P1 a copy of the memory block as received from P0 as part of a regular or vanilla Fill command 1122, and not as part of a chain data message. The read chain state of the MAF entry at P2 then transitions from the One_FRead_Pending state 904 to the Idle state 902, as indicated by arrow 916.

The write chain state field 518 at P2 reflects that the MAF entry is in the Inval_Pending state 1006, and the write pointer field indicates P4. Accordingly, P2 also invalidates its copy of the memory block, and issues an IAck command 1124 to P4, thereby confirming P2's invalidation of the memory block. As the processing required for the memory block at P2 is then complete, the MAF controller 412 deactivates the entry.

P1 receives the Fill command 1122 and processes it in the above described manner. That is, P1 processes the data and then checks the read chain state and write chain state of the MAF entry associated with the memory block. Because P1 was never sent a chain building message, the read chain state of the MAF entry stayed in the Idle state 902. The write chain state is in the Inval_Pending state 1006 as a result of the Inval command received from the home memory subsystem, and the write pointer field indicates P4. Accordingly, P1 invalidates its copy of the memory block, and issues an IAck command 1126 to P4, thereby confirming P1's invalidation of the memory block. The MAF controller 412 then deactivates the entry.

It should be understood that because P1 and P5 are both located at the end of their respective read chains 1102 and 1104, respectively, they are not required to forward the memory block to any other entity. As a result, there is no need to inform either P1 or P5 that they are even part of a read chain. Accordingly, no chain building messages are sent to either P1 or P5. Furthermore, when a MAF entry is in the One_FRead_Pending state 904, then the MAF controller "knows" that the read pointer field specifies the last entity in the read chain. By definition, no other entity is waiting for a data fill from the last entity of a read chain. Accordingly, the memory block can be supplied to the last entity as part of a regular Fill command.

Turning back to the write chain 1110, P4 receives the FillMod command 1114 from P0 that includes a copy of the memory block as modified by P0. The memory block is temporarily stored at P4's MAF buffer, and the Fill states transitions from the active state to the idle state. As the FillMod command 1114 includes an Inval Count of four, the MAF controller 412 sets the Inval Count field 508 of the MAF entry associated with the memory block to four. As described above, P0, P3, P2 and P1 each issue an IAck command to P4. As each of these commands are received, the respective MAF entry's Ack Count field 510 is incremented by one. When the Ack Count field 510 also reaches four, thus matching the Inval Count field 508, the memory block is transferred into P4's cache or a register and is modified by P4. The MAF controller 412, after waiting for the write-done field 522 to be asserted by the processor, then checks to see whether P4 is part of a read and/or write chain. Specifically, the MAF controller 412 checks the MAF entry's read chain state as reflected in field 514. As explained above, P4's MAF entry is in the One_FRead_Pending state 904, and the read pointer field 512 indicates P5. Because the MAF entry is in the One_FRead_Pending read chain state 904 rather than the Multiple_FReads_Pending state 912, P4 issues a regular Fill command 1128, rather than a Chain_Fill command, to P5, and transitions the read chain state from the One_FRead_Pending state 904 to the Idle state 902 as indicated by arrow 916 (FIG. 9).

As the write chain state field 518 reflects that the MAF entry at P4 is in the FReadMod_Pending state 1004, and as the write pointer field 516 indicates processor P6, P4 also issues a FillMod command 1130 to P6 that includes a copy of the memory block as modified by P4. The FillMod command 1130, like the FReadMod command received at P4 from the home memory subsystem, specifies an Inval Count of two. P4 also invalidates the memory block and sends P6 and IAck command 1132.

P5 receives the Fill command 1128 and stores the memory block in its MAF buffer 422. The MAF controller 412 transitions the block from the MAF buffer 422 to P5's cache or a register so that the thread or process executing at P5 can make progress. P5 then checks the read chain state and write chain state of the MAF entry associated with the memory block. Because P5 was never sent a chain building message, such as a Chain or Chain_Last command, the read chain state of the MAF entry remained in the Idle state 902. The write chain state, however, is in the Inval_Pending state 1006, and the write pointer field indicates P6, as a result of the Inval command received from the home memory subsystem triggered in response to the ReadMod command from P6. Accordingly, P5 invalidates its copy of the memory block, and issues an IAck command 1134 to P6, thereby confirming P5's invalidation of the memory block. Write chain state machine engine 420 transitions the write chain state of the MAF entry from the Inval_Pending state 1006 to the Idle state 1002, as indicated by arrow 1016 (FIG. 10). P5's MAF controller 412 then deactivates the entry.

P6 receives the FillMod command 1130 from P4 that includes a copy of the memory block as modified by P4. The memory block is temporarily stored at P6's MAF buffer, and the Fill states transitions from the active state to the idle state. As the FillMod includes an Inval Count of two, the MAF controller sets the Inval Count field 508 of the MAF entry associated with the memory block to two. As described above, both P4 and P5 each issued an IAck command to P6. As each of these commands are received, the MAF entry's Ack Count field 510 is incremented by one. When the Ack Count field 510 reaches two, thus matching the Inval Count field 508, the memory block is transferred into P4's cache or a processor register and is modified by P4. The MAF controller 412 then checks to see whether P6 is part of a read and/or write chain. Specifically, the MAF controller 412 checks the MAF entry's read chain state as reflected in field 514.

Here, P6's MAF entry is in the Idle read chain state 902 as the P6 has not received any FRead commands from the home memory subsystem. The write chain state of the MAF entry at P6 is also in the Idle state 1002 as no FReadMod or Inval commands have been received. Accordingly, no entity is waiting for either read or write access to the copy of the memory block as modified by P6. The memory block thus remains in P6's cache or processor register in a valid state until it is either written back to its home memory subsystem or invalidated through an FReadMod or Inval command designating the memory block. In other words, P6 represents the end or termination point of write chain 1110, and there is no read chain hanging off of P6.

As shown, the MAF entries at each processor P0–P6 cooperate to achieve active inheritance of the writes to the memory block. Specifically, even though a write probe, e.g., a FReadMod command, can be received at a processor before the processor's own earlier write to the block has become consistent, the processor does not release the block, e.g., issue a FillMod and an IAck, until it has received all outstanding IAcks for the block. Each processor thus guarantees that all writes issued earlier than its write are consistent before its own write can become consistent.

Full Block Write

Suppose that the home memory system receives a FBW command for the memory block following receipt of the ReadMod command from P6. In response to the FBW command the home memory subsystem buffers the received version of the memory block and accesses the directory entry. The directory entry shows that P6 is the owner, that there are no sharers, and that the memory is last writer. Accordingly, the memory controller issues a Full_Block_Write_Invalidate (FBW_Inval) command to P6 on the Q1 virtual channel.

At P6, suppose the FBW_Inval command misses on P6's cache as the memory block has yet to be received from P4. The MAF controller 412 access the MAF entry for the block. The write chain state machine engine 420, in response to the FBW_Inval command, transitions the write chain state of the MAF entry from the Idle state 1002 to the Full_Block_Write_Pending state 1008, as indicated by arrow 1018. This state is stored at the MAF entry's write chain state field 518. In the write pointer field 516, engine 420 preferably enters the ID assigned to the entity that sourced the underlying FBW command, as indicated in the FBW_Inval command.

Thereafter, when the memory block is received at P6 from P4, and the Inval Count field and Ack Count field are the same, the block is transferred into P6's cache or processor register for modification by P6. P6 can thus make forward progress. Upon the completion of the write and the assertion of the write-done field, the MAF controller 412 accesses the read chain state field 514 and the write chain state field 518 to see whether any read or write chains have been created. In this example, P6's MAF entry is in the Full_Block_Write_Pending state 1008. Accordingly, the memory block is invalidated from P6's cache or register, and an IAck command is issued by P6. The IAck command is sent to the entity that sourced the FBW command. Upon issuing the IAck command thereby confirming P6's invalidation of the memory block, P6's write chain state machine engine 420 transitions the write chain state of the MAF entry from the Full_Block_Write_Pending state 1008 to the Idle state 1002, as indicated by arrow 1020 (FIG. 10).

It should be understood that the Full_Block_Write_Pending state 1008 can also be used for I2D commands. That is, as far as the processors are concerned, a FBW command is the same as an I2D command. Both result in the respective block being invalidated at the processor and an IAck command being sent to the entity that sourced the I2D or FBW command.

Furthermore, it is worth noting that, in accordance with the illustrative embodiment, neither chain building nor chain data messages are sent along a write chain, such as write chain 1110. Also, an entity within a read chain, such as P2 or P3 of first read chain 1106, receives at most one chain building message, such a Chain or Chain_Last command, regardless of how many entities are ultimately added to the chain.

As shown, the MAF entries created by multiple entities all seeking read or write access to the same memory block cooperate to form the read and write chains. In particular, the MAF entry established at each entity (other than the last entity) constitutes a link in a read and/or write chain, and points to the next entity in the chain(s). Each MAF entry further stores state information to ensure that the appropriate response is sent to the next entity in the chain(s) once the data is available. As the responses are sent, moreover, the chains are torn down. That is, the read and write chains are short-lived or transitory. They are not persistent. Once the obligations established by each link of the chains are satisfied, the respective MAF entry is deactivated, and can be used to track an outstanding request for some other memory block.

Because each MAF entry only stores the identity of the next link in the read and/or write chains, the resolution mechanism of the present invention is highly scalable. That is, the MAF entries can accommodate substantial increases in the number of processors and/or other entities added to the SMP system without having to be changed.

It should be understood that in some system designs, the data processing entities, e.g., the processors, may be permitted to fill a cache line with a received memory block over which the entity has requested write access (and utilize the block's contents in its processing) prior to receiving all outstanding IAcks for the block.

It should be understood that, in an alternative embodiment, the read pointer field 512, read chain state field 514, write pointer field 516, write chain state field 518, and the write-done field 522 could be located in one or more data structures other than the MAF that is nonetheless associated with the respective processor, such as a dedicated chain data structure.

The foregoing description has been directed to specific embodiments of the present invention. It will be apparent, however, that other variations and modifications may be made to the described embodiments, with the attainment of some or all of their advantages. For example, the SMP system could employ a plurality of physically independent channels, each having its own components, such as control logic, buffers, etc., instead of virtual channels that share such components. Furthermore, the invention could be used with a single processor computer system. Therefore, it is the object of the appended claims to cover all such variations and modifications as come within the true spirit and scope of the invention.

What is claimed is:

1. A method of ensuring data consistency in a computer system having a plurality of data processing entities and a shared memory organized into a plurality of memory blocks, at least some of the data processing entities configured to issue requests for selected memory blocks, the method comprising:
   issuing from a plurality of data processing entities a sequence of writes targeting a given memory block;
   linking the writes to the given memory block into a write chain, the write chain specifying a last data processing entity in the sequence, and being free from having one or more reads targeting the given memory block;
   at each data processing entity in the write chain other than the last data processing entity, storing information that identifies the next data processing entity in the write chain; and
   at each data processing entity in the write chain other than the last data processing entity, ensuring that the prior data processing entity completed its write before completing the current write.

2. The method of claim 1 further comprising:
   providing a data structure at each data processing entity; and
   configuring the data structure at each data processing entity in the write chain other than the last data processing entity to store a pointer to a next data processing entity in the write chain.

3. The method of claim 1 further comprising proving one or more directories for maintaining cache coherency status information over the memory blocks.

4. The method of claim 1 wherein the data processing entities include one of processors and input/output (I/O) subsystems.

5. A method of ensuring data consistency in a computer system having a plurality of data processing entities and a shared memory organized into a plurality of memory blocks, at least some of the data processing entities configured to issue requests for selected memory blocks, the method comprising:
   issuing from a plurality of data processing entities a sequence of writes targeting a given memory black;
   linking the writes to the given memory block into a write chain, the write chain specifying a last data processing entity in the sequence;
   at each data processing entity in the write chain other than the last date processing entity, storing information that identifies the next data processing entity in the write chain;
   at each data processing entity in the write chain other than the last data processing entity, ensuring that the prior data processing entity completed its write before completing the current write;
   providing a data structure at each data processing entity;
   configuring the data structure at each data processing entity in the write chain other than the last data processing entity to store a pointer to a next data processing entity in the write chain; and
   configuring the data structure at each data processing entity in the write chain to indicate:
      an Inval Count corresponding to a number of data processing entities that had a copy of the given memory block at the time the respective data processing entity issued its write, and
      an Invalidate_Acknowledgement (IAck) count corresponding to a number of IAcks received by the respective data processing entity.

6. The method of claim 5 further comprising:
   providing at least some of the data processing entities with a cache configured to store memory blocks;
   comparing the Inval Count with the IAck Count; and
   if the two counts match, placing the given memory block in the cache and modifying the given memory block by performing the respective write
   if the two numbers match, considering the given memory block to be consistent.

7. The method of claim 6 further comprising:
   providing the data structure with a write done flag; and
   upon modifying the given memory block, asserting the write done flag.

8. The method of claim 7 further comprising, upon assertion of the write done flag, sending the modified data block to the next data processing entity in the write chain as indicated by the pointer.

9. The method of claim 8 wherein the data structure is part of a miss address file (MAF) configured to track outstanding requests for memory blocks issued to the shared memory.

10. The method of claim 9 wherein each MAF is configured to include:
    an Inval Count field;
    an IAck Count field;
    a Write Pointer field; and
    a Write Chain State field.

11. The method of claim 5 wherein the data processing entities include one of processors and input/output (I/O) subsystems.

12. A computer system comprising:
    a plurality of data processing entities, at least some of the data processing entities having one or more caches; and
    a main memory coupled to the plurality of data processing entities by an interconnect fabric, the main memory organized to store data in terms of memory blocks at least one or more of which are shared by the plurality of data processing entities,
    wherein the data processing entities are configured to:
       issue writes to a given memory block,
       cooperate in the formation of a write chain linking each of the data processing entities that issued a write to the given memory block, the write chain specifying a last data processing entity, and each data processing entity in the write chain, other than the last data processing entity, specifying a next data processing entity in the write chain, and the write chain free from having one or more reads, and
       ensure that a prior data processing entity in the write chain completed its write before completing the respective data processing entity's write.

13. The computer system of claim 12 wherein
    each data processing entity has a data structure, each data structure configured to have a write pointer field and a write state field,
    the write pointer fields of the data structures at the data processing entities forming the write chain, other than the last data processing entity, store a pointer to a next data processing entity in the write chain.

14. The computer system of claim 12 further comprising one or more directories for use in maintaining cache coherence of the memory blocks, the one or more directories having an entry for each memory block, each directory entry including an owner field for specifying an owner of the memory block, and a writer field for specifying the last data processing entity to have written the memory block back to the main memory.

15. A computer system comprising:
a plurality of data processing entities, at least some of the data processing entities having one or more caches; and
a main memory coupled to the plurality of data processing entities by an interconnect fabric, the main memory organized to store data in terms of memory blocks at least one or more of which are shared by the plurality of data processing entities,
wherein the data processing entities are configured to:
issue writes to a given memory block,
cooperate in the formation of a write chain linking each of the data processing entities that issued a write to the given memory block, and
ensure that a prior data processing entity in the write chain completed its write before completing the respective data processing entity's write
wherein each data processing entity has a data structure, each data structure configured to have a write pointer field and a write state field,
wherein the write pointer fields of the data structures at the data processing entities forming the write chain, other than the last data processing entity, store a pointer to a next data processing entity in the write chain
wherein the data structures are further configured to include
an Inval Count corresponding to a number of data processing entities that had a copy of the given memory block at the time the respective data processing entity issued its write, and
an Invalidate_Acknowledgement (IAck) count corresponding to a number of IAcks received by the respective data processing entity.

16. The computer system of claim 15 wherein
each data processing entity has a miss address file (MAF) configured to track out-standing requests for memory blocks issued to the shared memory, and
the data structure is part of the MAF.

17. The computer system of claim 16 wherein the data processing entities include one of processors and input/output (I/O) subsystems.

18. A computer system comprising:
a plurality of data processing entities, at least some of the data processing entities having one or more caches;
a main memory coupled to the plurality of data processing entities by an interconnect fabric, the main memory organized to store data in terms of memory blocks at least one or more of which are shared by the plurality of data processing entities; and
one or more directories for use in maintaining cache coherence of the memory blocks, the one or more directories having an entry for each memory block, each directory entry including an owner field for specifying an owner of the memory block, and a writer field for specifying the last data processing entity to have written the memory block back to the main memory,
wherein the data processing entities are configured to:
issue writes to a given memory block,
cooperate in the formation of a write chain linking each of the data processing entities that issued a write to the given memory block, and
ensure that a prior data processing entity in the write chain completed its write before completing the respective data processing entity's write.

* * * * *

UNITED STATES PATENT AND TRADEMARK OFFICE
CERTIFICATE OF CORRECTION

| | |
|---|---|
| PATENT NO. | : 7,003,635 B2 |
| APPLICATION NO. | : 10/263742 |
| DATED | : February 21, 2006 |
| INVENTOR(S) | : Stephen R. Van Doren |

Page 1 of 1

It is certified that error appears in the above-identified patent and that said Letters Patent is hereby corrected as shown below:

In column 29, line 42, in Claim 5, delete "black;" and insert -- block; --, therefor.

In column 29, line 47, in Claim 5, delete "date" and insert -- data --, therefor.

In column 32, line 3, in Claim 16, delete "out-standing" and insert -- outstanding --, therefor.

Signed and Sealed this

Fourth Day of August, 2009

JOHN DOLL
*Acting Director of the United States Patent and Trademark Office*